United States Patent
Wang et al.

(10) Patent No.: US 12,108,045 B2
(45) Date of Patent: Oct. 1, 2024

(54) ENCODING/DECODING METHOD AND APPARATUS FOR MOTION VECTOR INFORMATION

(71) Applicant: SAMSUNG ELECTRONICS CO., LTD., Suwon-si (KR)

(72) Inventors: Fan Wang, Beijing (CN); Xiao Ouyang, Beijing (CN); Yinji Piao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 17/420,696

(22) PCT Filed: Jan. 3, 2020

(86) PCT No.: PCT/KR2020/000090
§ 371 (c)(1),
(2) Date: Jul. 5, 2021

(87) PCT Pub. No.: WO2020/141922
PCT Pub. Date: Jul. 9, 2020

(65) Prior Publication Data
US 2022/0103826 A1     Mar. 31, 2022

(30) Foreign Application Priority Data

Jan. 4, 2019 (CN) .......................... 201910011266.9

(51) Int. Cl.
*H04N 19/53* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/30* (2014.11)

(58) Field of Classification Search
None
See application file for complete search history.

(56) References Cited

U.S. PATENT DOCUMENTS

| | | |
|---|---|---|
| 8,194,746 B2 | 6/2012 | Suzuki |
| 10,848,780 B2 | 11/2020 | Lee et al. |

(Continued)

FOREIGN PATENT DOCUMENTS

| | | |
|---|---|---|
| CN | 1550110 A | 11/2004 |
| CN | 106165419 A | 11/2016 |

(Continued)

OTHER PUBLICATIONS

Communication issued Mar. 30, 2023 by the National Intellectual Property Administration of P.R. China in Chinese Patent Application No. 201910011266.9.

(Continued)

*Primary Examiner* — Christopher G Findley
(74) *Attorney, Agent, or Firm* — Sughrue Mion, PLLC

(57) ABSTRACT

The present application provides a method for encoding motion vector information, including: determining, for a current block, one or more combinations of motion vector predictions and motion vector resolutions, based on a correspondence between motion vector resolutions in an MVR (motion vector resolution) list and motion vector predictions in a history-based motion vector prediction list; determining a combination of a motion vector resolution and a motion vector prediction for the current block from the determined one or more combinations; determining, for the current block, a prediction vector difference based on the motion vector prediction and the motion vector information of the current block; and encoding, into a bitstream, at least the final motion vector resolution information indicating the motion vector resolution and the motion vector prediction (Continued)

and motion vector difference information indicating the prediction vector difference.

6 Claims, 7 Drawing Sheets

(51) Int. Cl.
*H04N 19/137* (2014.01)
*H04N 19/176* (2014.01)
*H04N 19/30* (2014.01)

(56) References Cited

U.S. PATENT DOCUMENTS

| | | | |
|---|---|---|---|
| 2007/0025442 A1 | 2/2007 | Okada et al. | |
| 2013/0070846 A1 | 3/2013 | Lim et al. | |
| 2013/0202047 A1 | 8/2013 | Song et al. | |
| 2013/0294518 A1 | 11/2013 | Lim et al. | |
| 2015/0195562 A1 | 7/2015 | Li et al. | |
| 2015/0264390 A1 | 9/2015 | Laroche et al. | |
| 2016/0337662 A1 | 11/2016 | Pang et al. | |
| 2017/0339426 A1* | 11/2017 | Lee | H04N 19/70 |
| 2020/0359039 A1* | 11/2020 | Zhao | H04N 19/51 |
| 2023/0081809 A1 | 3/2023 | Lee et al. | |

FOREIGN PATENT DOCUMENTS

| | | |
|---|---|---|
| CN | 107113442 A | 8/2017 |
| CN | 107277506 A | 10/2017 |
| EP | 3 203 743 A1 | 8/2017 |
| JP | 2007-96540 A | 4/2007 |
| KR | 10-2017-0078673 A | 7/2017 |

OTHER PUBLICATIONS

Communication issued Jan. 23, 2023 by the Intellectual Property Office of India in Indian Patent Application No. 202147034811.
Liu, Hongbin, et al., "CE4-related: Adaptive Motion Vector Resolution for Affine Inter Mode", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0332-v1. (15 pages total).
Wei, Chen, "Frame Rate Up-Conversion Algorithm Research Based On Motion Estimation and Motion Compensation", China Excellent Master's Thesis Full Text Database (Information Technology Series), Issue 3, Mar. 31, 2016. (62 pages total).
Communication dated Sep. 20, 2022, issued by the European Patent Office in European Application No. 20736200.5.
International Search Report and Written Opinion (PCT/ISA/210 & PCT/ISA/237) issued Apr. 13, 2020, issued by the International Searching Authority in International Application No. PCT/KR2020/000090.
Bross, et al., "Versatile Video Coding (Draft 3)", Dec. 20, 2018, Joint Video Experts Team (JVET) of ITU-T SG 16 WP 3 and ISO/IEC JTC 1/SC 29/WG 11, JVET-L1001-v7, 225 pages total.
Communication issued Apr. 18, 2022 by the Korean Intellectual Property Office in Korean Patent Application No. 10-2021-7024781.

* cited by examiner

[Fig. 1a]
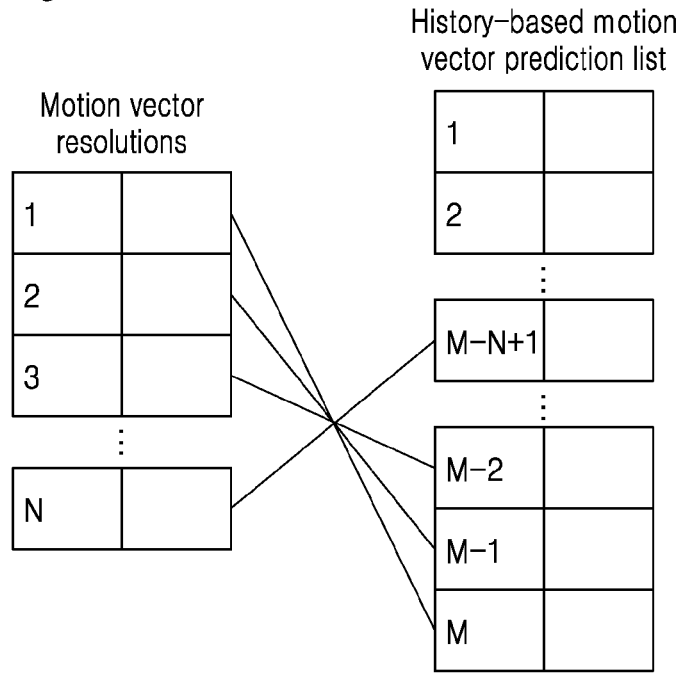
[Fig. 1b]
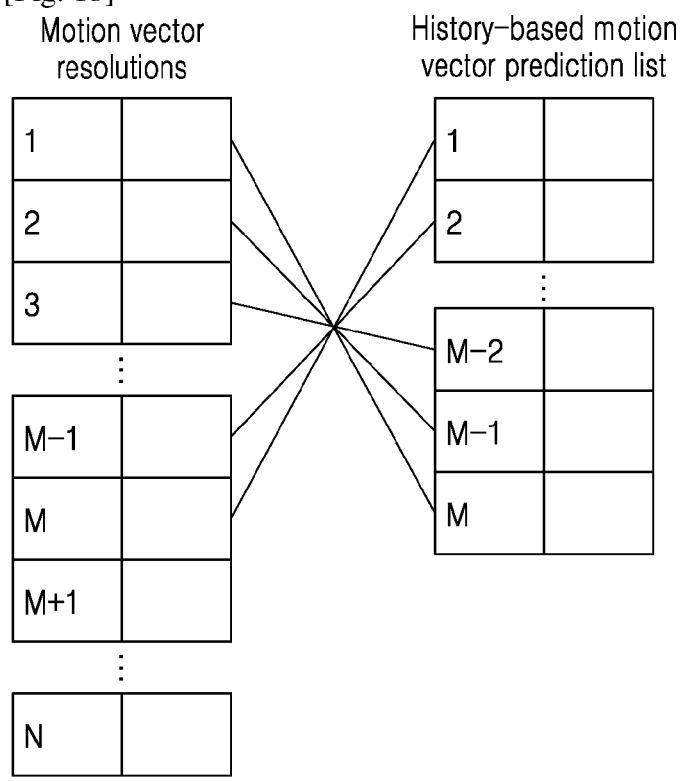

[Fig. 2a]
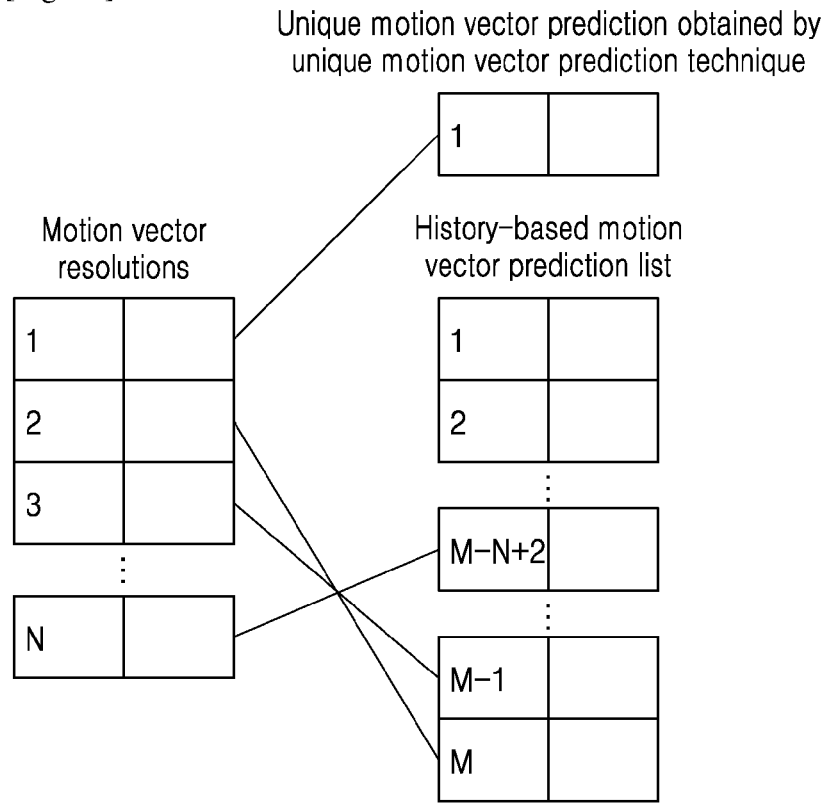
[Fig. 2b]
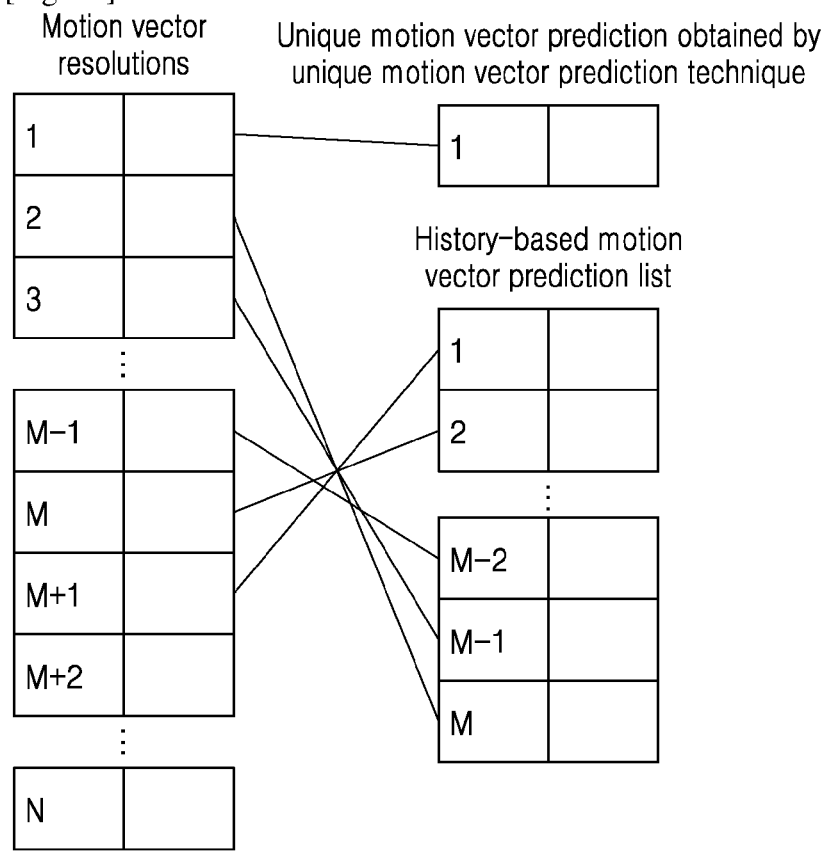

[Fig. 2c]
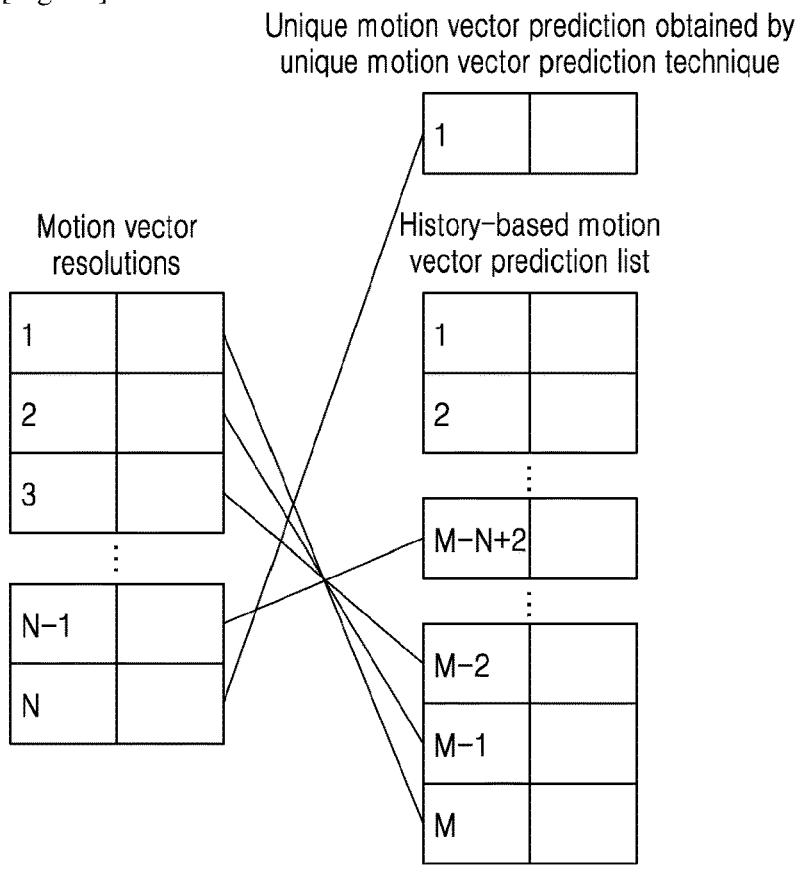
[Fig. 2d]
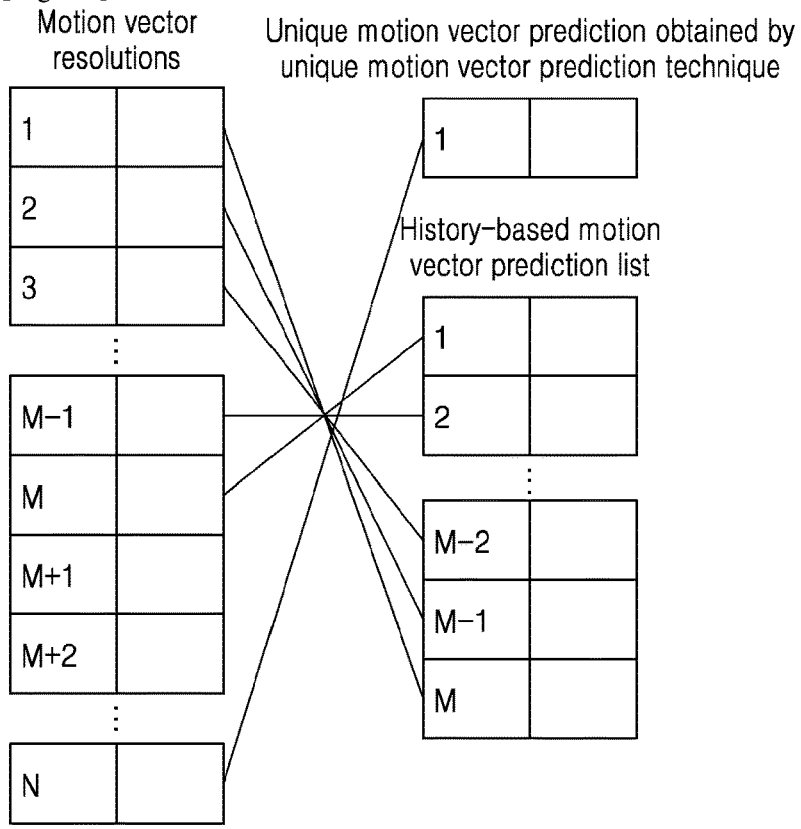

[Fig. 3a]
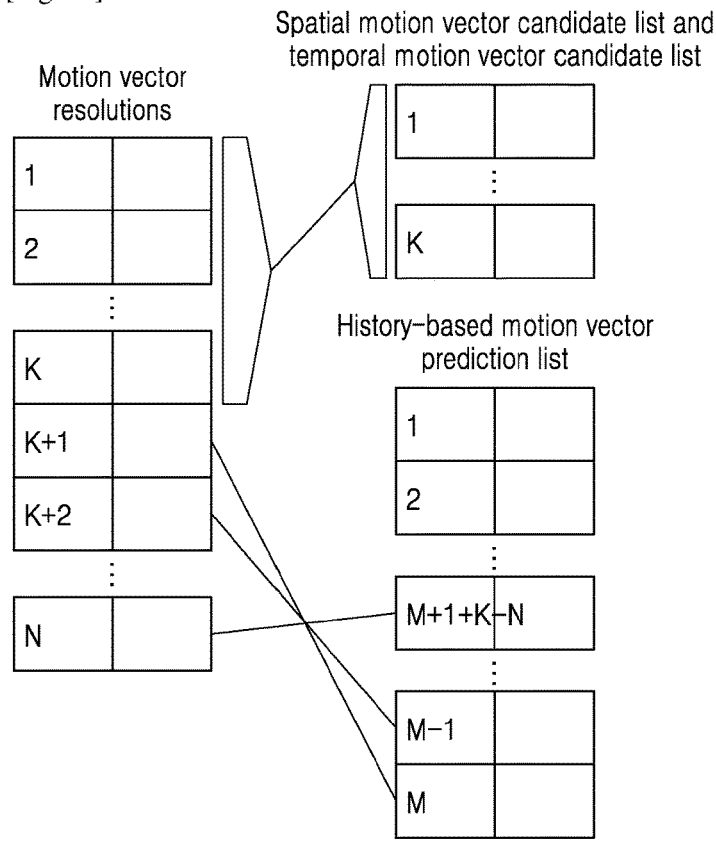
[Fig. 3b]
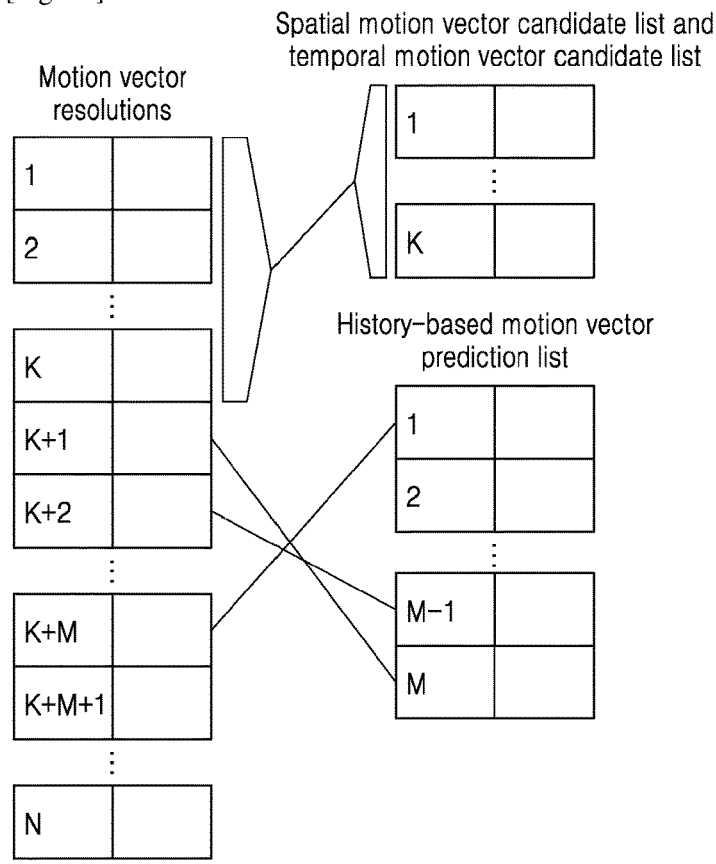

[Fig. 4]
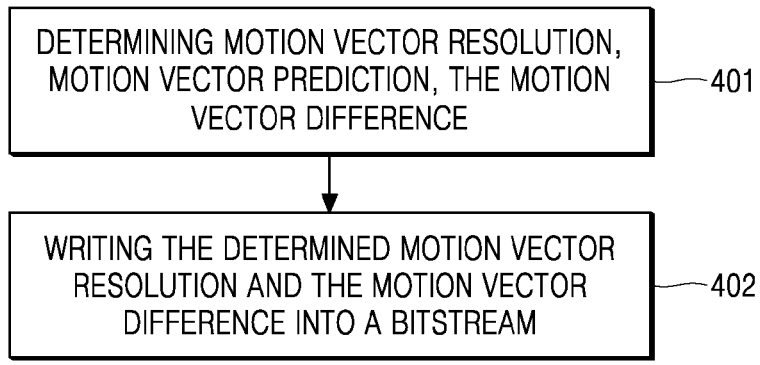
[Fig. 5]
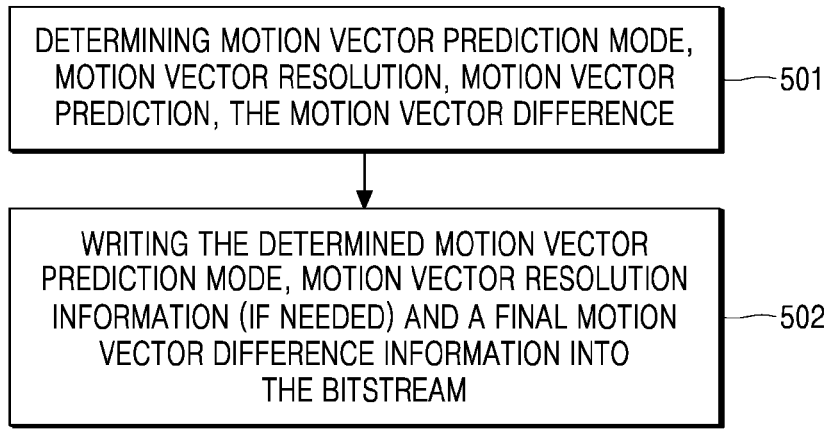
[Fig. 6]
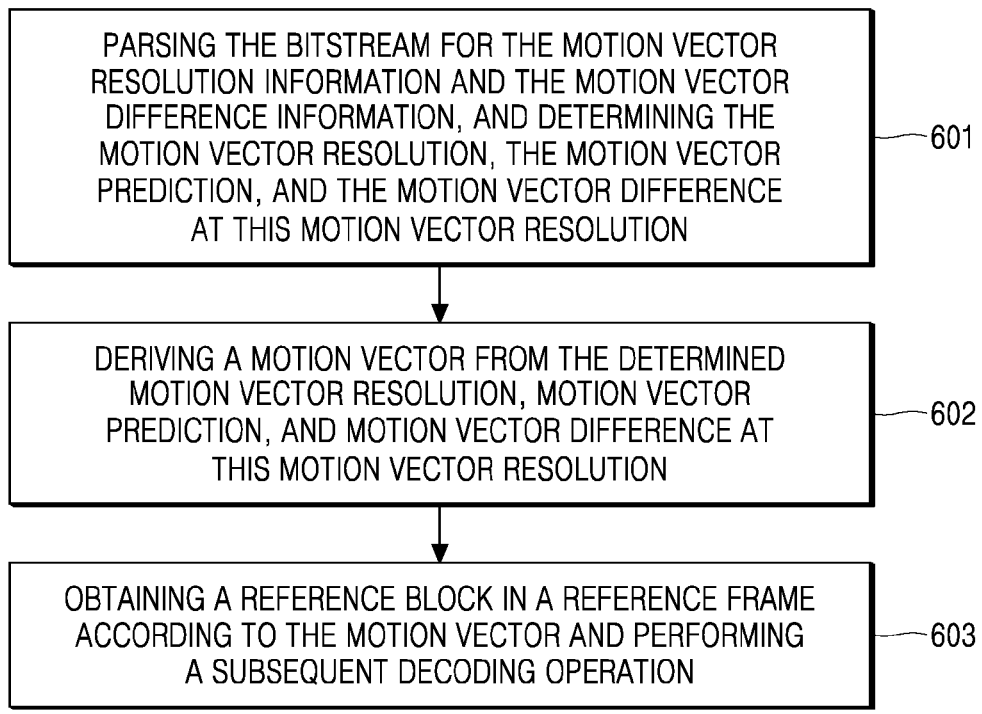

[Fig. 7]
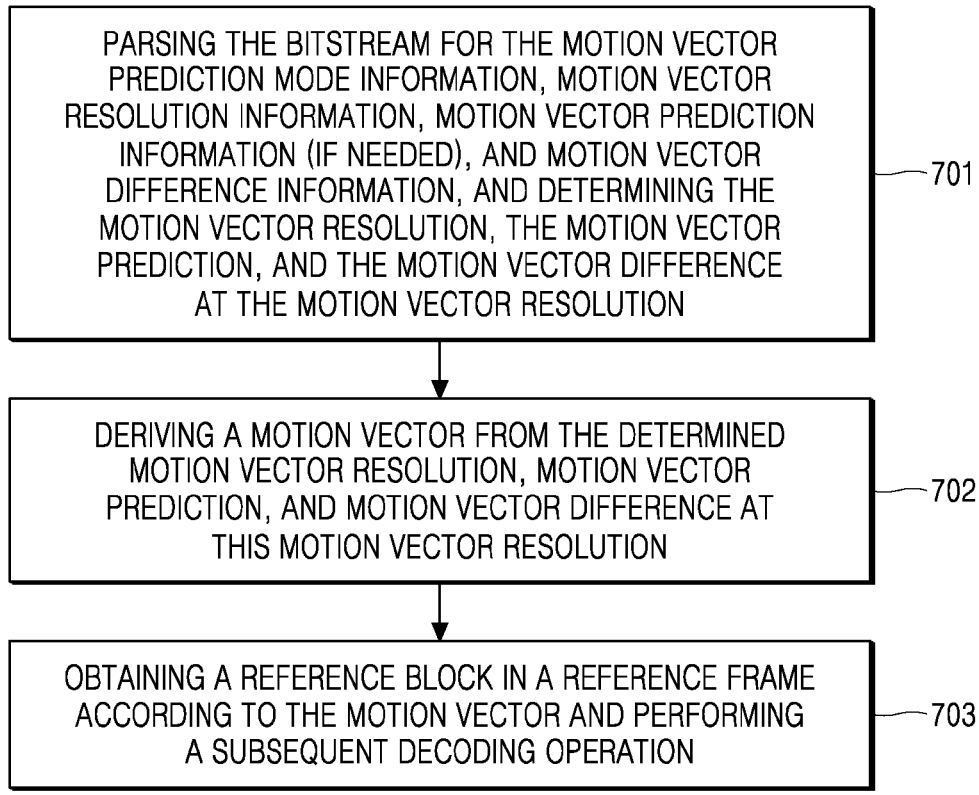
[Fig. 8]
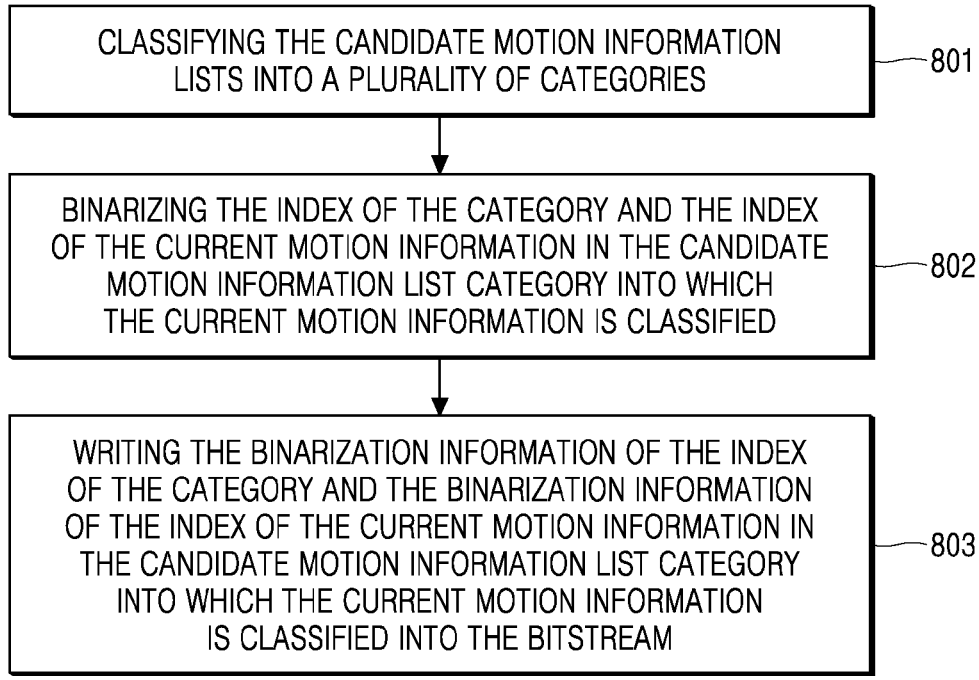

[Fig. 9]
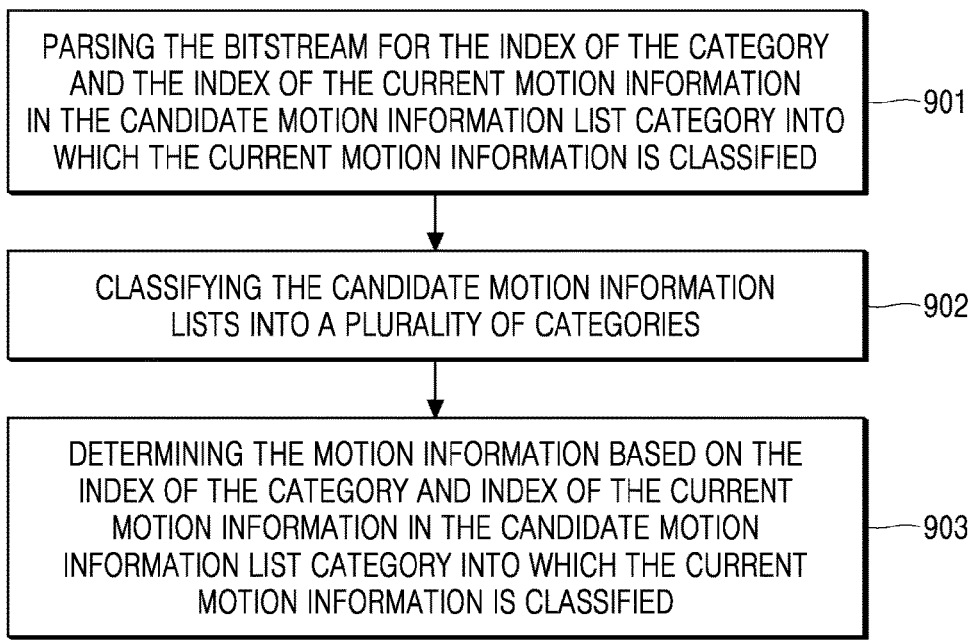
[Fig. 10]
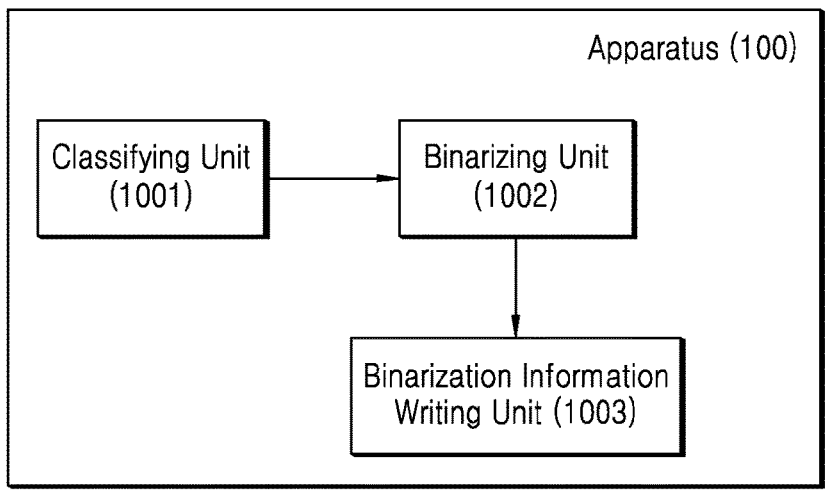
[Fig. 11]
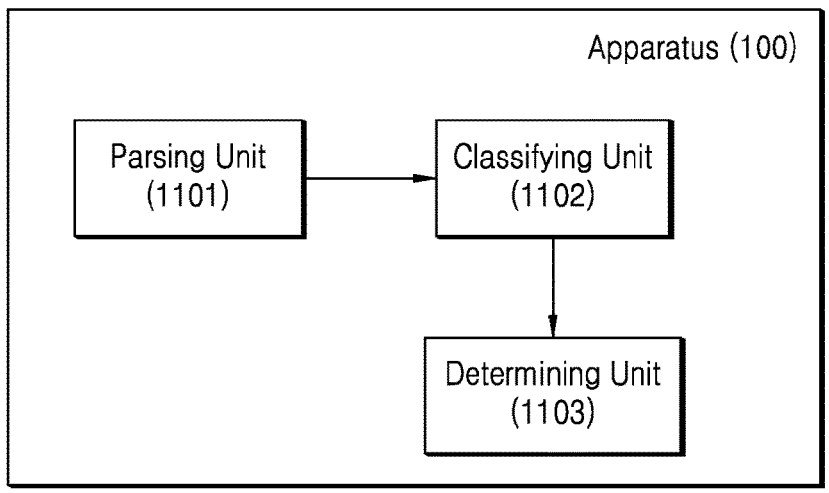

ENCODING/DECODING METHOD AND APPARATUS FOR MOTION VECTOR INFORMATION

TECHNICAL FIELD

The present invention relates to the field of video encoding/decoding technology, and more particularly to a corresponding method between the motion vector resolutions and motion vector predictions, and an encoding/decoding method and apparatus for motion vector information based on the corresponding method.

BACKGROUND ART

In natural video, there is a high degree of similarity between images. Therefore, in video compression, in order to remove information redundancy between images, inter prediction is often performed. The so-called inter prediction is to predict the current image to be encoded by using an already encoded image, and then pass the prediction error to a decoder. Compared to direct transmission of the content of the current image, the amount of information of the prediction error is much smaller, thus achieving the purpose of compression. In actual inter prediction, an encoder needs to find a reference block for each current block that matches with it as much as possible in the previously encoded reference pictures, so as to minimize the prediction error. A position difference between the current block and the reference block is called a motion vector, and the motion vector information also needs to be transmitted in the bitstream so that the decoder can know which reference block is for the current block.

Therefore, although the technique of inter prediction reduces the pixel information transmitted in the bitstream, it increases the new information that needs to be transmitted. With the development of prediction technique, the prediction error is getting smaller and smaller, so the proportion of the motion vector information in the bitstream is getting larger and larger. Therefore, the motion vector information also needs to be compressed. The conventional method is to predict the motion vector, and write the difference between the motion vector prediction and the motion vector into the bitstream. This difference is called the motion vector difference. The size of the motion vector difference is much smaller than that of the original motion vector. In this way, the motion vector information is compressed.

The motion vector of the current block is predictable. A method for predicting motion vector uses the correlation of motion vectors in spatial to derive a unique motion vector prediction from conditional judgment and calculation on the motion vectors of several peripheral blocks. This method is called a unique motion vector prediction technique. Experts in the field of video coding have also proposed an advanced motion vector prediction technique. The technique utilizes the correlation of motion vectors in spatial and temporal to establish a spatial candidate list and a temporal candidate list respectively, and then selects an optimal motion vector prediction from the candidate lists. The spatial candidate list requires the motion vector of the peripheral block of the current block or a scaled value for the motion vector, and the temporal candidate list requires a scaled value for the motion vector of the block adjacent to the corresponding reference block position in the encoded image. The encoder selects the optimal motion vector prediction from the spatial and temporal candidate lists and writes an index of the optimal motion vector prediction into the bitstream.

In recent years, there emerges a history-based motion vector prediction technique, HMVP for short. The technique establishes and maintains a list of motion vectors of a certain length. The motion vector list is a first in first out (FIFO) queue or a FIFO queue with restrictions (with which non-repetition is guaranteed). The encoder also writes the index of the optimal motion vector prediction into the bitstream. The history-based motion vector prediction technique increases the number of motion vector prediction candidates, thereby contributing to an improvement in coding performance.

In view of improving the inter prediction efficiency, in order to obtain a reference block that is more matched with the current block, the current codec uses sub-pixel inter prediction, that is, the position of the reference block in the reference image is not necessarily of full-pixel, it can also be of sub-pixel. In order to support the sub-pixel reference block, the motion vector resolution shall also be of sub-pixel, and thus the motion vector difference is in turn of sub-pixel resolution. Thus, on the one hand, the use of the reference block at the sub-pixel position improves the efficiency of the inter prediction, and reduces the prediction error, and on the other hand, the use of the motion vector difference of the sub-pixel resolution increases the number of bits required for transmitting the motion vector information in the bitstream.

In order to balance this contradiction, experts in the field of video coding have proposed an adaptive motion vector resolution (AMVR) technique. The so-called AMVR technique means that the motion vector difference transmitted in the bitstream and the motion vector resolution used in the actual encoding/decoding are non-fixed, and different image blocks may adopt different motion vector resolutions. Thus, some large motion vector differences can be represented by the motion vector differences with low pixel resolution to reduce bits of transmission.

An implementation method for the AMVR technique is: the encoder selects the motion vector resolution according to the current block condition, and then transmits an index of the used resolution in the bitstream.

In this way, the index of the motion vector prediction and the index of the motion vector resolution need to be written into the bitstream. Some experts have proposed a corresponding method between a motion vector resolution and a motion vector prediction at a specific position in spatial or temporal. This method is called an AMVR bounded by spatial and temporal motion vector prediction technique. For example, a first motion vector resolution for a current block corresponds to the motion vector prediction obtained from the left neighboring block of the image block. This reduces the transmission of the index of the motion vector prediction in the bitstream, further improving the coding efficiency.

The latest international video coding standard VVC and the latest domestic video coding standard AVS3 use HMVP-based techniques in inter-skip mode coding and inter-direct mode coding. This technique expands a candidate motion information list in the case of the inter-skip mode and the inter-direct mode, that is, the motion information (called historical motion information) that the encoder has ever used is added to the candidate motion information list, and the encoder can obtain more motion information for prediction. Meanwhile, in VVC or AVS3, the motion information extended to the candidate motion information list also needs to be identified by the index, so that it can be determined that, via the index, which motion information in the candidate motion information list is adopted in the intra-skip mode or the intradirect mode.

DISCLOSURE OF INVENTION

Technical Problem

Although a plurality of motion vector prediction candidates are provided in the advanced motion vector prediction and the history-based motion information prediction, it is necessary to transmit the index of the motion vector prediction in the bitstream. However, although the AMVR bounded by the spatial and temporal motion vector prediction technique eliminates the transmission of the index of the motion vector prediction in the bitstream, it has certain limitations by adopting only the motion vector prediction for temporally and spatially adjacent blocks.

On the other hand, in VVC or AVS3, the coding efficiency of the index of the motion information in the candidate motion information list is not high, mainly reflected in the binarization of the index of the motion information, and the existing standards adopt the binarization method by truncating a unary code. After adopting the HMVP coding technique, as the amounts of motion information in the candidate motion information list increases, the distribution of the probability of the index of the motion information no longer meets the distribution of the probability decreasing with the index of the motion information increasing, so it is necessary to have a new binarization method.

Solution to Problem

In order to solve the above problems in the prior art, in a first aspect of the present application, the present application provides a method for encoding motion vector information, including: determining, for a current block, one or more combinations of motion vector predictions and motion vector resolutions, based on a correspondence between motion vector resolutions in an MVR (motion vector resolution) list and motion vector predictions in a history-based motion vector prediction list, determining a combination of a motion vector resolution and a motion vector prediction for the current block from the determined one or more combinations, determining, for the current block, a prediction vector difference based on the motion vector prediction and the motion vector information of the current block, and encoding, into a bitstream, at least the final motion vector resolution information indicating the motion vector resolution and the motion vector prediction and motion vector difference information indicating the prediction vector difference.

According to the first aspect, wherein at least one motion vector resolution in the MVR list corresponds to a unique motion vector prediction obtained via a unique motion vector prediction method, and rest of the motion vector resolutions in the MVR list correspond to the motion vector predictions in the history-based motion vector prediction list.

According to the first aspect, wherein a portion of the motion vector resolutions in the MVR list correspond to the motion vector predictions in a spatial candidate list and a temporal candidate list obtained by an AMVR bounded by a spatial and temporal motion vector prediction method, and rest of the motion vector resolutions in the MVR list correspond to the motion vector predictions in the history-based motion vector prediction list.

According to the first aspect, a correspondence order between the motion vector resolutions and the motion vector predictions is one of the following: a sequential correspondence order in which the order of the motion vector resolutions to be corresponded is consistent with the order of the motion vector predictions to be corresponded, and a reverse correspondence order in which the order of the motion vector resolutions to be corresponded is contrary to the order of the motion vector predictions to be corresponded.

According to the first aspect, wherein, when the number of motion vector resolutions is greater than the number of motion vector predictions, ones of the motion vector resolutions for which a corresponding operation is not performed correspond to the motion vector predictions again in a certain order until the corresponding operation is performed for all of the motion vector resolutions, wherein the certain order is the same as the sequential correspondence order or the reverse correspondence order in which the corresponding operation is performed for ones of the motion vector resolutions corresponded to the motion vector predictions.

According to the first aspect, wherein, when the number of motion vector resolutions is greater than the number of motion vector predictions, ones of the motion vector resolutions for which the corresponding operation is not performed correspond to a certain one of the motion vector predictions.

According to the first aspect, wherein, when the number of motion vector resolutions is greater than the number of motion vector predictions, ones of the motion vector resolutions for which the corresponding operation is not performed do not correspond to any of the motion vector predictions.

According to the first aspect, wherein one of a first motion vector resolution and a last motion vector resolution of the motion vector resolutions corresponds to the unique motion vector prediction, and the rest of the motion vector resolutions correspond to the motion vector predictions in the history-based motion vector prediction list in a correspondence order, and the correspondence order is one of the following: a sequential correspondence order in which the order of the motion vector resolutions to be corresponded is consistent with the order of the motion vector predictions to be corresponded, and a reverse correspondence order in which the order of the motion vector resolutions to be corresponded is contrary to the order of the motion vector predictions to be corresponded.

According to the first aspect, wherein, when the number of the rest of the motion vector resolutions is greater than the number of the motion vector predictions in the history-based motion vector prediction list, ones of the motion vector resolutions for which the corresponding operation is not performed correspond to the unique motion vector prediction.

According to the first aspect, wherein, when the number of the rest of the motion vector resolutions is greater than the number of the motion vector predictions in the history-based motion vector prediction list, ones of the motion vector resolutions for which the corresponding operation is not performed correspond to the motion vector predictions in the history-based motion vector prediction list again in a certain order until the corresponding operation is performed for all of the motion vector resolutions, wherein the certain order is the same as the sequential correspondence order or the reverse correspondence order in which the corresponding operation is performed for ones of the motion vector resolutions corresponded to the motion vector predictions.

According to the first aspect, wherein, when the number of the rest of the motion vector resolutions is greater than the number of the motion vector predictions in the history-based motion vector prediction list, ones of the motion vector resolutions for which the corresponding operation is not performed correspond to a certain one of the motion vector predictions in the history-based motion vector prediction list.

According to the first aspect, wherein, when the number of the rest of the motion vector resolutions is greater than the number of the motion vector predictions in the history-based motion vector prediction list, ones of the motion vector resolutions for which the corresponding operation is not performed do not correspond to any of the motion vector predictions.

According to the first aspect, wherein, a first portion of the motion vector resolutions corresponds to the motion vector predictions in the spatial candidate list and the temporal candidate list, a second portion of the motion vector resolutions other than the first portion corresponds to the motion vector predictions in the history-based motion vector prediction list.

According to the first aspect, wherein, a correspondence order between the motion vector resolutions in the second portion and the motion vector predictions in the history-based motion vector prediction list is one of the following: the sequential correspondence order in which the order of the motion vector resolutions to be corresponded is consistent with the order of the motion vector predictions to be corresponded, and the reverse correspondence order in which the order of the motion vector resolutions to be corresponded is contrary to the order of the motion vector predictions to be corresponded.

According to the first aspect, wherein, when the number of motion vector resolutions in the second portion is greater than the number of the motion vector predictions in the history-based motion vector prediction list, ones of the motion vector resolutions in the second portion for which the corresponding operation is not performed correspond to the motion vector predictions in the history-based motion vector prediction list again in a certain order until the corresponding operation is performed for all of the motion vector resolutions, wherein the certain order is the same as the sequential correspondence order or the reverse correspondence order in which the corresponding operation is performed for ones of the motion vector resolutions in the second portion corresponded to the motion vector predictions.

According to the first aspect, wherein, when the number of motion vector resolutions in the second portion is greater than the number of the motion vector predictions in the history-based motion vector prediction list, ones of the motion vector resolutions in the second portion for which the corresponding operation is not performed correspond to a certain one of the motion vector predictions in the history-based motion vector prediction list.

According to the first aspect, wherein, when the number of motion vector resolutions in the second portion is greater than the number of the motion vector predictions in the history-based motion vector prediction list, ones of the motion vector resolutions in the second portion for which the corresponding operation is not performed do not correspond to any of the motion vector predictions in the history-based motion vector prediction list.

According to the first aspect, wherein, in a case where the current motion vector prediction has occurred in ones of the motion vector predictions for which a corresponding operation is performed, the current motion vector prediction is skipped, and the current motion vector resolution corresponds to one of the motion vector predictions meeting a constraint, wherein, the constraint is that the one of the motion vector predictions has not occurred in ones of the motion vector predictions for which a corresponding operation is performed.

According to the first aspect, wherein, in a case where there is no motion vector prediction that meets the constraint, the ones of the motion vector resolutions for which the corresponding operation is not performed correspond to a certain one of the motion vector predictions.

According to the first aspect, the method further includes determining a prediction direction and determining a reference frame based on the prediction direction.

According to the first aspect, wherein, the determining the prediction direction includes: in a case where the prediction direction of the motion vector prediction is one of the following: a first direction referring only to a first reference frame list, a second direction referring only to a second reference frame list, or a third direction referring to the first and second reference frame lists, the prediction direction is determined as the referred direction.

According to the first aspect, wherein, the determining the prediction direction includes: in a case where the prediction direction of the motion vector prediction is the first direction referring only to the first reference frame list, or the second direction referring only to the second reference frame list, the prediction direction is determined as the referred one; and in a case where the prediction direction of the motion vector prediction is the third direction referring to the first and second reference frame lists, the prediction direction is determined as the first direction, the second direction, and the third direction.

According to the first aspect, wherein, the determining the prediction direction includes: determining the reference frame as a reference frame corresponding to the motion vector prediction in the determined prediction direction.

According to the first aspect, wherein, the determining the combination of the motion vector resolution and motion vector prediction and determining the prediction vector difference based on the determined motion vector prediction includes: determining the optimal motion vectors at different motion resolutions, in different prediction directions, at different reference frames, by the motion searching method, and calculating the motion vector difference; and then comparing the coding costs of encoding the current block using the optimal motion vectors at different resolutions, in different prediction directions, at different reference frames, thereby determining the combination of the motion vector resolution and motion vector prediction, the prediction direction, the reference frame, and the motion vector difference at the motion vector resolution.

According to the first aspect, wherein, regardless of the prediction direction of the motion vector prediction corresponding to the motion vector resolution, the prediction direction information is not encoded into the bitstream, but the prediction direction is considered to be the same as the prediction direction of the motion vector prediction corresponding to the motion vector resolution.

According to the first aspect, wherein, in a case where the prediction direction of the motion vector prediction is the first direction referring only to the first reference frame list or the second direction referring only to the second reference frame list, the prediction direction information is not encoded into the bitstream, but the prediction direction is considered to be the same as the prediction direction of the motion vector prediction corresponding to the motion vector resolution; and in a case where the prediction direction of the motion vector prediction is the third direction referring to the first and second reference frame lists, the prediction direction information is encoded into the bitstream together with the determined motion vector resolution information and motion vector difference information.

According to the first aspect, wherein, regardless of the reference frame, the reference frame information is not encoded into the bitstream, but is regarded as a reference frame of motion vector prediction corresponding to the motion vector resolution.

According to the first aspect, wherein, in a case where the prediction direction is the first direction referring only to the first reference frame list or the second direction referring only to the second reference frame list, the reference frame information is not encoded into the bitstream, and the reference frame is determined as the reference frame of the motion vector prediction corresponding to the motion vector resolution; and in a case where the prediction direction is the third direction referring to the first and second reference frame lists, the reference frame information is encoded into the bitstream.

According to the first aspect, the method further includes determining a motion vector prediction mode, and encoding the motion vector prediction mode into the bitstream.

According to the first aspect, wherein, the determining the motion vector prediction mode includes: deriving a first coding cost for the current block in a first mode in which the correspondence that the motion vector resolutions at least partially correspond to the motion vector predictions is not used; deriving a second coding cost for the current block in a second mode in which the correspondence that the motion vector resolutions at least partially correspond to the motion vector predictions is used; and comparing the first coding cost with the second coding cost, and selecting a mode with a smaller coding cost as the motion vector prediction mode.

According to the first aspect, the method further includes: the motion vector prediction information is encoded into the bitstream if the motion vector prediction mode is the first mode; and the motion vector prediction information is not encoded into the bitstream if the motion vector prediction mode is the second mode.

In a second aspect of the present application, an apparatus for encoding motion vector information is provided, in which the method according to the first aspect is performed.

In a third aspect of the present application, a decoding method for motion vector information is provided, including: acquiring, from a bitstream, motion vector resolution information and motion vector difference information for a current block, determining a motion vector prediction and a motion vector resolution according to the motion vector resolution information, based on a correspondence between motion vector resolutions in a MVR list and a history-based motion vector prediction list, determining a motion vector difference based on the motion vector difference information and the motion vector resolution; and determining motion vector information based on the motion vector prediction and the motion vector prediction.

According to the third aspect, wherein at least one motion vector resolution in the MVR list corresponds to a unique motion vector prediction obtained via a unique motion vector prediction method, and rest of the motion vector resolutions in the MVR list correspond to the motion vector predictions in the history-based motion vector prediction list.

According to the third aspect, wherein a portion of the motion vector resolutions in the MVR list correspond to the motion vector predictions in the spatial candidate list and the temporal candidate list obtained by the AMVR bounded by the spatial and temporal motion vector prediction method, and rest of the motion vector resolutions in the MVR list correspond to the motion vector predictions in the history-based motion vector prediction list.

According to the third aspect, a correspondence order between the motion vector resolutions and the motion vector predictions is one of the following: a sequential correspondence order in which the order of the motion vector resolutions to be corresponded is consistent with the order of the motion vector predictions to be corresponded, and a reverse correspondence order in which the order of the motion vector resolutions to be corresponded is contrary to the order of the motion vector predictions to be corresponded.

According to the third aspect, wherein, when the number of motion vector resolutions is greater than the number of motion vector predictions, ones of the motion vector resolutions for which a corresponding operation is not performed correspond to the motion vector predictions again in a certain order until the corresponding operation is performed for all of the motion vector resolutions, wherein the certain order is the same as the sequential correspondence order or the reverse correspondence order in which the corresponding operation is performed for ones of the motion vector resolutions corresponded to the motion vector predictions.

According to the third aspect, wherein, when the number of motion vector resolutions is greater than the number of motion vector predictions, ones of the motion vector resolutions for which the corresponding operation is not performed correspond to a certain one of the motion vector predictions.

According to the third aspect, wherein, when the number of motion vector resolutions is greater than the number of motion vector predictions, ones of the motion vector resolutions for which the corresponding operation is not performed do not correspond to any of the motion vector predictions.

According to the third aspect, wherein one of a first motion vector resolution and a last motion vector resolution of the motion vector resolutions corresponds to the unique motion vector prediction, and the rest of the motion vector resolutions correspond to the motion vector predictions in the history-based motion vector prediction list in a correspondence order, and the correspondence order is one of the following: a sequential correspondence order in which the order of the motion vector resolutions to be corresponded is consistent with the order of the motion vector predictions to be corresponded, and a reverse correspondence order in which the order of the motion vector resolutions to be corresponded is contrary to the order of the motion vector predictions to be corresponded.

According to the third aspect, wherein, when the number of the rest of the motion vector resolutions is greater than the number of the motion vector predictions in the history-based motion vector prediction list, ones of the motion vector resolutions for which the corresponding operation is not performed correspond to the unique motion vector prediction.

According to the third aspect, wherein, when the number of the rest of the motion vector resolutions is greater than the number of the motion vector predictions in the history-based motion vector prediction list, ones of the motion vector resolutions for which the corresponding operation is not performed correspond to the motion vector predictions in the history-based motion vector prediction list again in a certain order until the corresponding operation is performed for all of the motion vector resolutions, wherein the certain order is the same as the sequential correspondence order or the reverse correspondence order in which the corresponding operation is performed for ones of the motion vector resolutions corresponded to the motion vector predictions.

According to the third aspect, wherein, when the number of the rest of the motion vector resolutions is greater than the number of the motion vector predictions in the history-based motion vector prediction list, ones of the motion vector resolutions for which the corresponding operation is not performed correspond to a certain one of the motion vector predictions in the history-based motion vector prediction list.

According to the third aspect, wherein, when the number of the rest of the motion vector resolutions is greater than the number of the motion vector predictions in the history-based motion vector prediction list, ones of the motion vector resolutions for which the corresponding operation is not performed do not correspond to any of the motion vector predictions.

According to the third aspect, wherein, a first portion of the motion vector resolutions corresponds to the motion vector predictions in the spatial candidate list and the temporal candidate list, a second portion of the motion vector resolutions other than the first portion corresponds to the motion vector predictions in the history-based motion vector prediction list.

According to the third aspect, wherein, the correspondence order between the motion vector resolutions of the first portion and the motion vector predictions in the spatial candidate list and the temporal candidate list is one of the sequential correspondence order and the reverse correspondence order, and the corresponding order between the motion vector resolutions of the second portion and the motion vector predictions in the history-based motion vector prediction list is one of the sequential correspondence order and the reverse correspondence order, wherein: the sequential correspondence order is an order in which the order of the motion vector resolutions to be corresponded is consistent with the order of the motion vector predictions to be corresponded, and the reverse correspondence order is an order in which the order of the motion vector resolutions to be corresponded is contrary to the order of the motion vector predictions to be corresponded.

According to the third aspect, wherein, when the number of motion vector resolutions in the second portion is greater than the number of the motion vector predictions in the history-based motion vector prediction list, ones of the motion vector resolutions in the second portion for which the corresponding operation is not performed correspond to the motion vector predictions in the history-based motion vector prediction list again in a certain order until the corresponding operation is performed for all of the motion vector resolutions, wherein the certain order is the same as the sequential correspondence order or the reverse correspondence order in which the corresponding operation is performed for ones of the motion vector resolutions in the second portion corresponded to the motion vector predictions.

According to the third aspect, wherein, when the number of motion vector resolutions in the second portion is greater than the number of the motion vector predictions in the history-based motion vector prediction list, ones of the motion vector resolutions in the second portion for which the corresponding operation is not performed correspond to a certain one of the motion vector predictions in the history-based motion vector prediction list.

According to the third aspect, wherein, when the number of motion vector resolutions in the second portion is greater than the number of the motion vector predictions in the history-based motion vector prediction list, ones of the motion vector resolutions in the second portion for which the corresponding operation is not performed do not correspond to any of the motion vector predictions in the history-based motion vector prediction list.

According to the third aspect, wherein, in a case where the current motion vector prediction has occurred in ones of the motion vector predictions for which a corresponding operation is performed, the current motion vector prediction is skipped, and the current motion vector resolution corresponds to one of the motion vector predictions meeting a constraint, wherein, the constraint is that the one of the motion vector predictions has not occurred in ones of the motion vector predictions for which a corresponding operation is performed.

According to the third aspect, wherein, in a case where there is no motion vector prediction that meets the constraint, the ones of the motion vector resolutions for which the corresponding operation is not performed correspond to a certain one of the motion vector predictions.

According to the third aspect, the method further includes: determining prediction direction information and reference frame information; and decoding for the motion vector information based on the motion vector resolution information, the motion vector difference information, the motion vector prediction, the prediction direction information, and the reference frame information.

According to the third aspect, wherein, the determining the prediction direction information includes: determining the prediction direction to be the same as the prediction direction of the motion vector prediction corresponding to the motion vector resolution.

According to the third aspect, wherein, the determining the prediction direction information includes: in a case where the prediction direction of the motion vector prediction corresponding to the motion vector resolution is a first direction referring only to a first reference frame list or a second direction referring only to a second reference frame list, determining the prediction direction to be the same as the prediction direction of the motion vector prediction corresponding to the motion vector resolution, and in a case where the prediction direction of the motion vector prediction corresponding to the motion vector resolution is a third direction referring to the first and second reference frame lists, acquiring, from a bitstream, the prediction direction information and determining the prediction direction according to the prediction direction information.

According to the third aspect, the determining the reference frame information includes: determining the reference frame to be the same as the reference frame of the motion vector prediction corresponding to the motion vector resolution.

According to the third aspect, the determining the reference frame information includes: in a case where the prediction direction of the motion vector prediction corresponding to the motion vector resolution is the first direction referring only to the first reference frame list or the second direction referring only to the second reference frame list, determining the reference frame to be the same as the reference frame of the motion vector prediction corresponding to the motion vector resolution, and in a case where the prediction direction of the motion vector prediction corresponding to the motion vector resolution is the third direction referring to the first and second reference frame lists, acquiring, from a bitstream, the reference frame information and determining the prediction direction according to the reference frame information.

According to the third aspect, the method further includes: in a case where the motion vector prediction mode is a first mode in which the correspondence is not used and a stipulated motion vector prediction is not unique, acquiring, from a bitstream, the motion vector prediction information.

In a fourth aspect of the present application, a decoding apparatus for motion vector information is provided in which the method according to the third aspect is performed.

In a fifth aspect of the present application, a method for binarizing motion vector information is provided, including: classifying candidate motion information lists into a plurality of categories; binarizing an index of each of the categories using a first binarization method, and binarizing the index of current motion information in the candidate motion information list category into which the current motion information is classified, by using a second binarization method; and writing binarization information derived by the first and second binarization methods into the bitstream.

According to the fifth aspect, wherein, the number of the categories of the candidate motion information lists is greater than or equal to 2, and the first binarization method and the second binarization method are the same method.

According to the fifth aspect, wherein, the number of the categories of the candidate motion information lists is greater than or equal to 2, and the first binarization method and the second binarization method are different methods.

In a sixth aspect of the present application, a method for determining motion vector information is provided, including: obtaining, from a bitstream, binarization information of an index of a category of a candidate motion information list and binarization information of an index of current motion information in a candidate motion information list category into which the current motion information is classified; parsing the obtained binarization information for the index of the category and the index of the current motion information in the candidate motion information list category into which the current motion information is classified; classifying the candidate motion information lists into a plurality of categories according to the same classification method for classifying the candidate motion information lists at an encoder side; determining motion information according to the parsed index of the category, index of the current motion information in the candidate motion information list category into which the current motion information is classified, and the classified categories; and performing decoding based on the motion information.

According to the sixth aspect, wherein, the parsing the obtained binarization information for the index of the category and the index of the current motion information in the candidate motion information list category into which the current motion information is classified includes: obtaining the index of the category by applying the inverse binarization method of the first binarization method to the binarization information of the index of the category in the bitstream; and obtaining the index of the current motion information in the candidate motion information list category in which the current motion information is classified, by applying the inverse binarization method of the second binarization method to the binarization information of the index of the current motion information in the candidate motion information list category in which the current motion information is classified in the bitstream.

According to the sixth aspect, wherein, the determining motion information according to the parsed index of the category, index of the current motion information in the candidate motion information list category into which the current motion information is classified, and the classified categories includes: determining, by using the index of the category, into which category the current motion information is classified, and finding the motion information in the determined category by using the index of the current motion information in the candidate motion information list category into which the current motion information is classified.

In a seventh aspect of the present application, an encoder is provided, including: a classification unit configured to classify candidate motion information lists into a plurality of categories; a binarization unit configured to binarize an index of each of the categories using a first binarization method, and to binarize an index of current motion information in a candidate motion information list category into which the current motion information is classified, by using a second binarization method; and a binarization information writing unit configured to write binarization information derived by the first and second binarization methods into the bitstream.

According to the seventh aspect, wherein, the number of the categories of the candidate motion information lists is greater than or equal to 2, and the first binarization method and the second binarization method are the same method.

According to the seventh aspect, wherein, the number of the categories of the candidate motion information lists is greater than or equal to 2, and the first binarization method and the second binarization method are different methods.

In an eighth aspect of the present application, a decoder is provided, including: an obtaining unit configured to: obtain, from a bitstream, binarization information of the index of the category of the candidate motion information list and binarization information of the index of current motion information in the candidate motion information list category into which the current motion information is classified; a parsing unit configured to parse the obtained binarization information for the index of the category and the index of the current motion information in the candidate motion information list category into which the current motion information is classified; a classifying unit configured to classify the candidate motion information lists into a plurality of categories according to the same classification method for classifying the candidate motion information lists at an encoder side; and a determining unit configured to determine motion information according to the parsed index of the category, index of the current motion information in the candidate motion information list category into which the current motion information is classified, and the classified categories.

According to the eighth aspect, the parsing unit is further configured to obtain the index of the category by applying the inverse binarization method of the first binarization method to the binarization information of the index of the category in the bitstream; and obtain the index of the current motion information in the candidate motion information list category into which the current motion information is classified, by applying the inverse binarization method of the second binarization method to the binarization information of the index of the current motion information in the candidate motion information list category into which the current motion information is classified in the bitstream.

According to the eighth aspect, the determining unit is further configured to: determine, by using the index of the category, into which category the current motion information is classified, and find the motion information in the determined category by using the index of the current motion information in the candidate motion information list category into which the current motion information is classified.

Advantageous Effects of Invention

The present application introduces the history-based motion vector predictions in the correspondence between the motion vector resolutions and the motion vector predictions of the AMVR technique, which not only eliminates the overhead caused by indicating the motion vector prediction, but also increases more candidate values compared to the motion vector predictions for the temporally and spatially adjacent blocks only, which can effectively reduce the value of the motion vector difference, thus improving the coding performance.

In addition, after VVC or AVS3 adopts the HMVP coding technique, the distribution of the probability of the index of motion information is no longer suitable for the binarization method by truncating a unary code. Therefore, the present invention proposes a binarization method for the index of the motion information. First, according to motion vector categories in the candidate motion information lists, the motion vectors in the candidate motion information lists are classified into multiple categories, denoted as the index of the category. The index of the category is then binarized, and the index of the motion information in the large category is binarized. This can effectively improve the binarization and coding efficiency, thereby improving the video coding compression efficiency.

BRIEF DESCRIPTION OF DRAWINGS

FIG. 1a and FIG. 1b exemplarily illustrate the correspondence between the motion vector resolutions of the AMVR technique and the motion vector predictions in the history-based motion vector prediction list according to an embodiment of the present invention.

FIGS. 2a-2d exemplarily illustrate the correspondence between the motion vector resolutions of the AMVR technique and the unique motion vector prediction obtained by the unique motion vector prediction technique, the motion vector predictions in the history-based motion vector prediction list according to an embodiment of the present invention.

FIG. 3a and FIG. 3b exemplarily illustrate the correspondence between the motion vector resolutions of the AMVR technique and the motion vector predictions in the spatial candidate list, in the temporal candidate list, and in the history-based motion vector prediction list according to an embodiment of the present invention.

FIG. 4 illustrates a flowchart 400 in a first embodiment of encoding motion vector information.

FIG. 5 illustrates a flowchart 500 in a second embodiment of encoding motion vector information.

FIG. 6 schematically illustrates a flowchart 600 in a first embodiment of decoding for motion vector information.

FIG. 7 schematically illustrates a flowchart 700 in a second embodiment of decoding for motion vector information.

FIG. 8 schematically illustrates a flowchart of a method for binarizing the index of the motion information in the inter-skip mode or the inter-direct mode at the encoder side.

FIG. 9 schematically illustrates a flowchart of obtaining motion information based on binarization information at the decoder side.

FIG. 10 schematically illustrates an apparatus for binarizing the index of the motion information in the inter-skip mode or the inter-direct mode.

FIG. 11 schematically illustrates an apparatus for obtaining motion information based on binarization information of the index of the motion information in the inter-skip mode or the inter-direct mode.

BEST MODE FOR CARRYING OUT THE INVENTION

In order to solve the above problems in the prior art, in a first aspect of the present application, the present application provides a method for encoding motion vector information, including: determining, for a current block, one or more combinations of motion vector predictions and motion vector resolutions, based on a correspondence between motion vector resolutions in an MVR (motion vector resolution) list and motion vector predictions in a history-based motion vector prediction list, determining a combination of a motion vector resolution and a motion vector prediction for the current block from the determined one or more combinations, determining, for the current block, a prediction vector difference based on the motion vector prediction and the motion vector information of the current block, and encoding, into a bitstream, at least the final motion vector resolution information indicating the motion vector resolution and the motion vector prediction and motion vector difference information indicating the prediction vector difference.

Mode for the Invention

The specific embodiments of the present invention are described in detail below, and it should be noted that the embodiments described herein are for illustrative purposes only and are not intended to limit the invention. In the following description, numerous specific details are set forth in order to provide a thorough understanding of the invention. However, it will be apparent to those skilled in the art that it is not necessary to adopt those specific details to implement the invention. In other instances, well-known circuits, materials or methods have not been described in detail in order to avoid obscuring the invention.

Throughout the specification, reference to "an embodiment", "embodiments", "an example" or "examples" means that, a particular feature, structure, or characteristic described in connection with the embodiment or example is included in at least one embodiment of the present invention. The appearance of the phrases "in an embodiment", "in the embodiment", "in an example", "in the example" throughout the specification does not refer to the same embodiment or example. Furthermore, the particular features, structures, or characteristics may be combined in one or more embodiments or examples in any suitable combination and/or sub-combination. In addition, those skilled in the art will appreciate that the drawings are provided herein for the purpose of illustration, and the drawings are not necessarily drawn to scale. It will be understood that when an element is "coupled" or "connected" to an other element, the element can be directly coupled or connected to the other element or an intermediate element may be present. In contrast, when an element is referred to as being "directly coupled" or "directly connected" to an other element, there is no intermediate element. The same reference numbers indicate the same elements. The term "and/or" used herein includes any and all combinations of one or more of the associated listed items.

I. Correspondence Between the Motion Vector Resolutions and the Motion Vector Predictions In order to solve problems of the motion vector prediction in the prior art, according to the present invention, a correspondence is formed between the motion vector resolutions of the AMVR technique and the motion vector predictions in the history-based motion vector prediction list, thereby not only eliminating the overhead caused by indicating the motion vector prediction, but also increasing more candidates compared to the motion vector predictions for the temporally and spatially adjacent blocks only, which can effectively reduce the value of the motion vector difference, thus improving the coding performance.

The correspondence between the motion vector resolutions of the AMVR technique (hereinafter referred to as motion vector resolution) and the motion vector predictions in the history-based motion vector prediction list may be diverse. The motion vector resolutions may not only correspond to the motion vector prediction in the history-based motion vector prediction list, but also correspond to, by introducing other motion vector predictions, the motion vector predictions formed by taking the motion vector predictions in the history-based motion vector prediction list and the introduced other motion vector predictions as a whole. Various correspondences will be exemplarily described below with reference to the accompanying drawings.

The Motion Vector Resolutions Only Correspond to the Motion Vector Predictions in the History-Based Motion Vector Prediction List FIG. 1a and FIG. 1b illustrate a case where the motion vector resolutions only correspond to the motion vector predictions in the history-based motion vector prediction list according to an embodiment of the present invention. Among others, the motion vector resolutions and the preset motion vector resolutions are commonly stipulated by the encoder/decoder or specified by the encoding/decoding standards, and one possible stipulation is one or more of one-sixteenth pixel, one-eighth pixel, one-quarter pixel, one-second pixel, full-pixel, two-pixel, four-pixel, eight-pixel, sixteen-pixel, or other power-of-two-pixel resolution.

In this case, the first motion vector resolution may correspond to the last motion vector prediction in the history-based motion vector prediction list, and the second motion vector resolution may correspond to the penultimate motion vector prediction in the history-based motion vector prediction list, and so on. However, those skilled in the art will appreciate that such a corresponding method between the motion vector resolutions and the motion vector predictions is merely exemplarily listed for purposes of illustration and description.

Alternatively, the first motion vector resolution may correspond to the first motion vector prediction in the history-based motion vector prediction list, and the second motion vector resolution may correspond to the second motion vector prediction in the history-based motion vector prediction list, and so on.

Alternatively, the motion vector resolutions may correspond to the motion vector predictions in the history-based motion vector prediction list in other correspondences different from any of the above-described correspondences.

For convenience of description, in this example, assuming that the number of the motion vector resolutions is N, the number of the motion vector predictions in the history-based motion vector prediction list is M.

FIG. 1a exemplarily illustrates a diagram of the correspondence between the motion vector resolutions and the motion vector predictions in the history-based motion vector prediction list when M is greater than or equal to N. As shown, the first motion vector resolution corresponds to the Mth motion vector prediction in the history-based motion vector prediction list, the second motion vector resolution corresponds to the M−1th motion vector prediction in the history-based motion vector prediction list, . . . , and the Nth motion vector resolution corresponds to the M−N+1th motion vector prediction in the history-based motion vector prediction list. In this case, for each motion vector resolution, there is a corresponding motion vector prediction in the history-based motion vector prediction list.

FIG. 1b exemplarily illustrates a diagram of the correspondence between the motion vector resolutions and the motion vector predictions in the history-based motion vector prediction list when M is less than N. As shown, the first motion vector resolution corresponds to the Mth motion vector prediction in the history-based motion vector prediction list, the second motion vector resolution corresponds to the M−1th motion vector prediction in the history-based motion vector prediction list, . . . , and the Mth motion vector resolution corresponds to the first motion vector prediction in the history-based motion vector prediction list.

In this case, for the M+1th to Nth motion vector resolutions, one of the following settings may be adopted:

(1) The first setting: the M+1th to Nth motion vector resolutions all correspond to a certain one of the motion vector predictions in the history-based motion vector prediction list. For example, the M+1th to Nth motion vector resolutions all correspond to the Mth motion vector prediction in the history-based motion vector prediction list.

(2) The second setting: the M+1th motion vector resolution corresponds to the Mth motion vector prediction in the history-based motion vector prediction list, and the M+2th motion vector resolution corresponds to the M−1th motion vector prediction in the history-based motion vector prediction list, and so on. When 2M≥N, in this case, for each motion vector resolution, there is a corresponding motion vector prediction in the history-based motion vector prediction list. When 2M<N, the corresponding method for the 2M+1th to Nth motion vector resolutions is consistent with the corresponding method for the M+1th to the 2Mth motion vector resolutions, and so on, until all the motion vector resolutions correspond to the motion vector predictions in the history-based motion vector prediction list.

(3) The third setting: the M+1th to Nth motion vector resolutions do not correspond to any of the motion vector predictions.

For any of the above corresponding methods, there may be such a constraint that if the current motion vector prediction has occurred in the motion vector predictions that have been corresponded, the current motion vector prediction is skipped, and the current motion vector resolution corresponds to the next candidate motion vector prediction meeting the constraint in the corresponding order described above. For example, if the second motion vector resolution corresponds to the M−1th motion vector prediction in the history-based motion vector prediction list, and it is found that the M−1th motion vector prediction is completely consistent with the Mth motion vector prediction, in this case, the M−1th motion vector prediction is skipped, and the second motion vector resolution corresponds to the M−2th motion vector prediction; if the M−2th motion vector prediction is still completely consistent with the Mth motion vector prediction, the downward corresponding operation is continued until a motion vector prediction that is inconsistent with the Mth motion vector prediction is found.

If there is no candidate motion vector prediction meeting the constraint in the history-based motion vector prediction list, the rest non-corresponding motion vector resolutions may all correspond to a certain motion vector prediction in the history-based motion vector prediction list. For example, the second to the Nth motion vector resolutions all correspond to the Mth motion vector prediction.

The Motion Vector Resolutions Correspond to the Unique Motion Vector Prediction Obtained by the Unique Motion Vector Prediction Technique and the Motion Vector Predictions in the History-Based Motion Vector Prediction List FIGS. 2a-2d illustrate a case where the motion vector resolutions correspond to the unique motion vector prediction obtained by the unique motion vector prediction technique and the motion vector predictions in the history-based motion vector prediction list according to an embodiment of the present invention. Among others, the motion vector resolutions and the preset motion vector resolutions are commonly stipulated by the encoder/decoder or specified by the encoding/decoding standards, and one possible stipulation is one or more of one-sixteenth pixel, one-eighth pixel, one-quarter pixel, one-second pixel, full-pixel, two-pixel, four-pixel, eight-pixel, sixteen-pixel, or other power-of-two-pixel resolution.

In this case, the first motion vector resolution may correspond to the unique motion vector prediction, the second motion vector resolution may correspond to the last motion vector prediction in the history-based motion vector prediction list, and the third motion vector resolution may correspond to the penultimate motion vector prediction in the history-based motion vector prediction list, and so on, until all of the motion vector resolutions have corresponding motion vector predictions. However, those skilled in the art will appreciate that such a corresponding method between the motion vector resolutions and the motion vector predictions is merely exemplarily listed for purposes of illustration and description.

Alternatively, the last motion vector resolution may correspond to the unique motion vector prediction.

Alternatively, the first motion vector resolution may correspond to the first motion vector prediction in the history-based motion vector prediction list, and the second motion vector resolution may correspond to the second motion vector prediction in the history-based motion vector prediction list, and so on.

Alternatively, the motion vector resolutions may correspond to the motion vector predictions in the history-based motion vector prediction list in other correspondences different from any of the above-described correspondences.

For convenience of description, in this example, assuming that the number of the motion vector resolutions is N, the number of the motion vector predictions in the history-based motion vector prediction list is M.

FIG. 2a and FIG. 2b illustrate a correspondence diagram in the case where the first motion vector resolution corresponds to the unique motion vector prediction.

FIG. 2a exemplarily illustrates a correspondence diagram in the case where the motion vector resolutions correspond to the unique motion vector prediction obtained by the unique motion vector prediction technique and the motion vector predictions in the history-based motion vector prediction list when M+1 is greater than or equal to N. As shown, the first motion vector resolution may correspond to the unique motion vector prediction, the second motion vector resolution may correspond to the Mth motion vector prediction in the history-based motion vector prediction list, and the third motion vector resolution may correspond to the M−1th motion vector prediction in the history-based motion vector prediction list, . . . , and the Nth motion vector resolution may correspond to the M−N+2th motion vector prediction in the history-based motion vector prediction list. In this case, for each motion vector resolution, there is a corresponding motion vector prediction in the history-based motion vector prediction list.

FIG. 2b exemplarily illustrates a correspondence diagram in the case where the motion vector resolutions correspond to the unique motion vector prediction obtained by the unique motion vector prediction technique and the motion vector predictions in the history-based motion vector predict when M+1 is less than N. As shown, the first motion vector resolution may correspond to the unique motion vector prediction, the second motion vector resolution may correspond to the Mth motion vector prediction in the history-based motion vector prediction list, and the third motion vector resolution may correspond to the M−1th motion vector prediction in the history-based motion vector prediction list, . . . , and the M+1th motion vector resolution may correspond to the first motion vector prediction in the history-based motion vector prediction list.

In this case, for the M+2th to Nth motion vector resolutions, one of the following settings may be adopted:

(1) The first setting: the M+2th to Nth motion vector resolutions all correspond to a certain one of the motion vector predictions in the history-based motion vector prediction list. For example, the M+2th to Nth motion vector resolutions all correspond to the Mth motion vector prediction in the history-based motion vector prediction list.

(2) The second setting: the M+2th to Nth motion vector resolutions all correspond to the unique motion vector prediction.

(3) The third setting: the M+2th motion vector resolution corresponds to the Mth motion vector prediction in the history-based motion vector prediction list, and the M+3th motion vector resolution corresponds to the M−1th motion vector prediction in the history-based motion vector prediction list, and so on. When 2M+1≥N, in this case, for each motion vector resolution, there is a corresponding motion vector prediction in the history-based motion vector prediction list. When 2M+1<N, the corresponding method for the 2M+2th to Nth motion vector resolutions is consistent with the corresponding method for the M+2th to the 2M+1th motion vector resolutions, and so on, until all the motion vector resolutions correspond to the motion vector predictions in the history-based motion vector prediction list.

(4) The fourth setting: the M+2th to Nth motion vector resolutions do not correspond to any of the motion vector predictions.

For any of the above corresponding methods, there may be such a constraint that if the current motion vector prediction has occurred in the motion vector predictions that have been corresponded, the current motion vector prediction is skipped, and the current motion vector resolution corresponds to the next candidate motion vector prediction meeting the constraint in the corresponding order described above. For example, if the third motion vector resolution corresponds to the M−1th motion vector prediction in the history-based motion vector prediction list, and it is found that the M−1th motion vector prediction is completely consistent with the Mth motion vector prediction, in this case, the M−1th motion vector prediction is skipped, and the third motion vector resolution corresponds to the M−2th motion vector prediction; if the M−2th motion vector prediction is still completely consistent with the Mth motion vector prediction, the downward corresponding operation is continued until a motion vector prediction that is inconsistent with the Mth motion vector prediction is found.

If there is no candidate motion vector prediction meeting the constraint in the history-based motion vector prediction list, the rest non-corresponding motion vector resolutions may all correspond to a certain motion vector prediction in the history-based motion vector prediction list. For example, the third to the Nth motion vector resolutions all correspond to the Mth motion vector prediction.

Alternatively, if there is no candidate motion vector prediction meeting the constraint in the history-based motion vector prediction list, the rest non-corresponding motion vector resolutions may all correspond to the unique motion vector prediction.

FIG. 2c and FIG. 2d illustrate a correspondence diagram in the case where the last motion vector resolution corresponds to the unique motion vector prediction.

FIG. 2c exemplarily illustrates a correspondence diagram in the case where the motion vector resolutions correspond to the unique motion vector prediction obtained by the unique motion vector prediction technique and the motion vector predictions in the history-based motion vector prediction list when M+1 is greater than or equal to N. As shown, the last motion vector resolution may correspond to the unique motion vector prediction, the first motion vector resolution may correspond to the Mth motion vector prediction in the history-based motion vector prediction list, and the second motion vector resolution may correspond to the M−1th motion vector prediction in the history-based motion vector prediction list, and so on. In this case, for each motion vector resolution, there is a corresponding motion vector prediction in the history-based motion vector prediction list.

FIG. 2d exemplarily illustrates a correspondence diagram in the case where the motion vector resolutions correspond to the unique motion vector prediction obtained by the unique motion vector prediction technique and the motion vector predictions in the history-based motion vector prediction list when M+1 is less than N. As shown, the last motion vector resolution may correspond to the unique motion vector prediction, the first motion vector resolution may correspond to the Mth motion vector prediction in the history-based motion vector prediction list, and the second motion vector resolution may correspond to the M−1th motion vector prediction in the history-based motion vector prediction list, . . . , and the Mth motion vector resolution may correspond to the first motion vector prediction in the history-based motion vector prediction list.

In this case, for the M+1th to N−1th motion vector resolutions, one of the following settings may be adopted:

(1) The first setting: the M+1th to N−1th motion vector resolutions all correspond to a certain one of the motion vector predictions in the history-based motion vector prediction list. For example, the M+1th to N−1th motion vector resolutions all correspond to the Mth motion vector prediction in the history-based motion vector prediction list.

(2) The second setting: the M+1th to N−1th motion vector resolutions all correspond to the unique motion vector prediction.

(3) The third setting: the M+1th motion vector resolution corresponds to the Mth motion vector prediction in the history-based motion vector prediction list, and the M+2th motion vector resolution corresponds to the M−1th motion vector prediction in the history-based motion vector prediction list, and so on. When 2M+1≥N, in this case, for each motion vector resolution, there is a corresponding motion vector prediction in the history-based motion vector prediction list. When 2M+1<N, the corresponding method for the 2M+2th to N−1th motion vector resolutions is consistent with the corresponding method for the M+1th to 2M+1th motion vector resolutions, and so on, until all the motion vector resolutions correspond to the motion vector predictions in the history-based motion vector prediction list.

(4) The fourth setting: the M+1th to Nth motion vector resolutions do not correspond to any of the motion vector predictions.

For any of the above corresponding methods, there may be such a constraint that if the current motion vector prediction has occurred in the motion vector predictions that have been corresponded, the current motion vector prediction is skipped, and the current motion vector resolution corresponds to the next candidate motion vector prediction meeting the constraint in the corresponding order described above. For example, if the second motion vector resolution corresponds to the M−1th motion vector prediction in the history-based motion vector prediction list, and it is found that the M−1th motion vector prediction is completely consistent with the Mth motion vector prediction, in this case, the M−1th motion vector prediction is skipped, and the second motion vector resolution corresponds to the M−2th motion vector prediction; if the M−2th motion vector prediction is still completely consistent with the Mth motion vector prediction, the downward corresponding operation is continued until a motion vector prediction that is inconsistent with the Mth motion vector prediction is found.

If there is no candidate motion vector prediction meeting the constraint in the history-based motion vector prediction list, the rest non-corresponding motion vector resolutions may all correspond to a certain motion vector prediction in the history-based motion vector prediction list. For example, the second to the N−1th motion vector resolutions all correspond to the Mth motion vector prediction.

Alternatively, if there is no candidate motion vector prediction meeting the constraint in the history-based motion vector prediction list, the rest non-corresponding motion vector resolutions may all correspond to the unique motion vector prediction.

The Motion Vector Resolutions Correspond to the Motion Vector Predictions in the Spatial Candidate List, in the Temporal Candidate List, and in the History-Based Motion Vector Prediction List FIG. 3a and FIG. 3b illustrate a case where the motion vector resolutions correspond to the motion vector predictions in the spatial candidate list, in the temporal candidate list, and in the history-based motion vector prediction list according to an embodiment of the present invention. Among others, the motion vector resolutions and the preset motion vector resolutions are commonly stipulated by the encoder/decoder or specified by the encoding/decoding standards, and one possible stipulation is one or more of one-sixteenth pixel, one-eighth pixel, one-quarter pixel, one-second pixel, full-pixel, two-pixel, four-pixel, eight-pixel, sixteen-pixel, or other power-of-two-pixel resolution.

In this case, the first half of the motion vector resolutions correspond to the motion vector predictions in the spatial candidate list and the temporal candidate list, and the specific corresponding method is not limited in the present invention, and then the second half of the motion vector resolutions that have not been corresponded to the motion vector predictions in the spatial candidate list and the temporal candidate list correspond to the motion vector predictions in the history-based motion vector prediction list. The number of the first half of the motion vector resolutions may be the same as or different from the number of the motion vector predictions in the spatial candidate list and the temporal candidate list. For example, as shown in FIG. 3a and FIG. 3b, the number of motion vector resolutions is N, and the number of motion vector predictions corresponding to the motion vector resolutions in the spatial candidate list and the temporal candidate list is K (K<N), and the number of motion vector predictions in the history-based motion vector prediction list is M. In this case, the first to Kth motion vector resolutions correspond to K motion vector predictions in the spatial candidate list and the temporal candidate list, and the K+1th to Nth motion vector resolutions correspond to M motion vector predictions in the history-based motion vector prediction list.

Corresponding manners for the first to Kth motion vector resolutions corresponding to K motion vector predictions in the spatial candidate list and the temporal candidate list are not limited in the present invention.

Regarding the corresponding method for the K+1th to the Nth motion vector resolutions corresponding to M motion vector predictions in the history-based motion vector prediction list, the K+1th motion vector resolution may correspond to the Mth motion vector prediction in the history-based motion vector prediction list, and the K+2th motion vector resolution may correspond to the M−1th motion vector prediction in the history-based motion vector prediction list, and so on.

When N−K≤M, the Nth motion vector resolution corresponds to the M+1+K−N motion vector prediction in the history-based motion vector prediction list, and in this case, N motion vector resolutions all have corresponding motion vector predictions (as shown in FIG. 3a). When N−K>M, the K+Mth motion vector resolution corresponds to the first motion vector prediction in the history-based motion vector prediction list, and for the K+M+1th to Nth motion vector resolutions, one of the following settings may be adopted:

(1) The first setting: the K+M+1th to Nth motion vector resolutions all correspond to a certain one of the motion vector predictions in the history-based motion vector prediction list. For example, the K+M+1th to Nth motion vector resolutions all correspond to the Mth motion vector prediction in the history-based motion vector prediction list.

(2) The second setting: the K+M+1th motion vector resolution corresponds to the Mth motion vector prediction in the history-based motion vector prediction list, the K+M+2th motion vector resolution corresponds to the M−1th motion vector prediction in the history-based motion vector prediction list, and so on, until all of the motion vector resolutions correspond to the motion vector predictions in the history-based motion vector prediction list.

(3) The third setting: the K+M+1th to Nth motion vector resolutions do not correspond to any of the motion vector predictions.

For any of the above corresponding methods, there may be such a constraint that if the current motion vector prediction has occurred in the motion vector predictions that have been corresponded, the current motion vector prediction is skipped, and the current motion vector resolution corresponds to the next candidate motion vector prediction meeting the constraint in the corresponding order described above. For example, if the K+2th motion vector resolution corresponds to the M−1th motion vector prediction in the history-based motion vector prediction list, and it is found that the M−1th motion vector prediction is completely consistent with the Mth motion vector prediction, in this case, the M−1th motion vector prediction is skipped, and the K+2th motion vector resolution corresponds to the M−2th motion vector prediction; if the M−2th motion vector prediction is still completely consistent with the Mth motion vector prediction, the downward corresponding operation is continued until a motion vector prediction that is inconsistent with the Mth motion vector prediction is found.

If there is no candidate motion vector prediction meeting the constraint in the history-based motion vector prediction list, the rest non-corresponding motion vector resolutions may all correspond to a certain motion vector prediction in the history-based motion vector prediction list. For example, the K+2th to the Nth motion vector resolutions all correspond to the Mth motion vector prediction.

Note that the above correspondences between the motion vector resolutions and the respective motion vector predictions are merely exemplarily listed for the purpose of convenience of explanation and description. Other motion vector predictions may also be introduced to combine with the motion vector predictions in the history-based motion vector prediction list as a whole, and then the combined motion vector predictions as a whole correspond to the motion vector resolutions.

II. Method for Encoding Motion Vector Information

First Embodiment of the Method for Encoding Motion Vector Information

According to the above mentioned correspondence manners between the motion vector resolutions and the motion vector predictions, the present application provides the method for encoding motion vector information in video encoding and decoding.

FIG. 4 illustrates a flowchart 400 in a first embodiment of encoding motion vector information based on the corresponding method between motion vector resolutions and motion vector predictions described above.

At step 401, the motion vector resolution, the motion vector prediction, and the motion vector difference are determined.

In a method for determining the motion vector resolution, the motion vector prediction, and the motion vector difference, in one example, the encoder can traverse all candidate motion vector resolutions, and find, for each motion vector resolution, the corresponding motion vector prediction based on the corresponding method between the motion vector resolutions and the motion vector predictions described above.

Thereafter, the optimal motion vector value at the determined motion vector resolution may be determined, for example, by a motion searching method, and the motion vector difference is calculated based on the optimal motion vector value at the determined motion vector resolution and the motion vector prediction corresponding to the determined motion vector resolution. In this case, there is a plurality of motion vector differences at a plurality of different motion vector resolutions. Then, the coding costs required to encode the current block using the optimal motion vector values at different motion vector resolutions are compared to determine the combination of the optimal motion vector resolution and motion vector prediction, and the motion vector difference at the optimal motion vector resolution.

In a method for determining the motion vector resolution, the motion vector prediction, and the motion vector difference, alternatively, in another example, the encoder may traverse all of the candidate motion vector values, determine, for each motion vector value, the combination of the optimal motion vector resolution and motion vector prediction, and then compare the coding costs required to encode the current block using the motion vector values at the respective optimal motion vector resolutions, thereby determining the combination of the optimal motion vector resolution and motion vector prediction, and the motion vector difference at the optimal motion vector resolution.

Among others, the candidate motion vector resolutions at step 401 are commonly stipulated by the encoder and decoder or specified in the encoding/decoding standards, and the candidate motion vector resolutions can be stipulated as one or more of one-sixteenth pixel, one-eighth pixel, one-quarter pixel, one-second pixel, full-pixel, two-pixel, four-pixel, eight-pixel, sixteen-pixel, or other power-of-two-pixel resolution.

At step 402, the determined optimal motion vector resolution information and the motion vector difference information at the resolution are written into the bitstream.

The optimal motion vector resolution information can be written into the bitstream, for example, in the form of the index, and the motion vector difference information at the resolution can be written into the bitstream using any existing motion vector difference coding scheme.

Optionally, prediction direction information may also be written into the bitstream as needed. One of the following methods can be adopted to determine the prediction direction:

(1) Regardless of whether the prediction direction of the motion vector prediction is to refer to only a first reference frame list, only a second reference frame list, or the two reference frame lists, the encoder attempts these three directions, that is, the optional range of the prediction directions includes the three directions.

(2) If the prediction direction of the motion vector prediction is to refer to only the first reference frame list, only the second reference frame list, or one of the two reference frame lists, the encoder only attempts the referred one direction.

(3) If the prediction direction of the motion vector prediction is to refer to only the first reference frame list or only the second reference frame list, the encoder only attempts that direction.

(4) If the prediction direction of the motion vector prediction refers to the two reference frame lists, the encoder attempts these three directions.

It will be understood by those skilled in the art that the above methods for determining the prediction direction are merely exemplarily listed for the purpose of illustration and description, and any of the existing well-known determination methods or new methods developed in the future may be adopted.

Optionally, reference frame information may also be written into the bitstream as needed. One of the following methods can be adopted for determining the reference frame:

(1) The encoder can traverse all reference frames in the reference frame list at the current prediction direction. The prediction value of the motion vector prediction under the reference frame is obtained by scaling the value of the motion vector prediction, and the method for scaling is not limited in the present invention.

(2) The encoder only attempts the reference frame corresponding to the determined prediction direction of the motion vector prediction.

It will be understood by those skilled in the art that the above determination methods of the reference frame are merely exemplarily listed for the purpose of illustration and description, and any of the existing well-known determination methods or new methods developed in the future may be adopted.

For prediction direction information, whether to transmit the prediction direction information may be commonly stipulated by the encoder/decoder or specified by encoding/decoding standards.

In one example, it may be specified to transmit the prediction direction information in the bitstream regardless of the prediction direction of the motion vector prediction corresponding to the motion vector resolution.

In an example, it may be specified that, regardless of the prediction direction of the motion vector prediction corresponding to the motion vector resolution, the prediction direction information is not transmitted in the bitstream, but the prediction direction is considered to be the same as the prediction direction of the motion vector prediction corresponding to the motion vector resolution by default.

In an example, it may be specified that if the prediction direction of the motion vector prediction corresponding to the motion vector resolution is to refer only to the first reference frame list or the second reference frame list, the prediction direction information is not transmitted in the bitstream, but the prediction direction is considered to be the same as the prediction direction of the motion vector prediction corresponding to the motion vector resolution by default. If the prediction direction of the motion vector prediction corresponding to the motion vector resolution is to refer to the two reference frame lists, the prediction direction information needs to be transmitted in the bitstream.

If it is determined that the prediction direction information needs to be transmitted in the bitstream, the prediction direction information may be encoded into the bitstream using any existing method for encoding prediction direction information.

For the reference frame information, whether to transmit the reference frame information may be commonly stipulated by the encoder/decoder or specified by encoding/decoding standards.

In one example, it may be specified to transmit the reference frame information in the bitstream regardless of the reference frame of the motion vector prediction corresponding to the motion vector resolution.

In one example, it may be specified that, regardless of the reference frame of the motion vector prediction corresponding to the motion vector resolution, the reference frame information is not transmitted in the bitstream, but the reference frame is considered to be the same as the reference frame of the motion vector prediction corresponding to the motion vector resolution by default.

In an example, it may be specified that if the prediction direction of the motion vector prediction corresponding to the motion vector resolution is to refer only to the first reference frame list or the second reference frame list, the reference frame information is not transmitted in the bitstream, but the reference frame is considered to be the same as the reference frame of the motion vector prediction corresponding to the motion vector resolution by default. If the prediction direction of the motion vector prediction corresponding to the motion vector resolution is to refer to the two reference frame lists, the reference frame information needs to be transmitted in the bitstream.

If it is determined that the reference frame information is to be transmitted in the bitstream, the reference frame information may be encoded using any existing method for encoding reference frame information.

Second Embodiment of the Method for Encoding Motion Vector Information

FIG. 5 illustrates a flowchart 500 in a second embodiment of encoding motion vector information.

At step 501, a motion vector prediction mode, the motion vector resolution, the motion vector prediction, and the motion vector difference are determined.

There are two types of motion vector prediction modes, one is not to use the correspondence between the motion vector predictions and the motion vector resolutions, and the other is to use the correspondence between the motion vector predictions and the motion vector resolutions.

A method for determining the motion vector prediction mode may be: the encoder attempts to obtain the coding cost of the current block in the mode in which the correspondence between the motion vector predictions and the motion vector resolutions is not used, and the encoder attempts to obtain the coding cost of the current block in the mode in which the correspondence between the motion vector predictions and the motion vector resolutions is used. The encoder compares the coding costs in these two modes, and selects the mode with a smaller coding cost as the optimal motion vector prediction mode.

In the mode in which the correspondence between the motion vector predictions and the motion vector resolutions is not used, any existing method may be adopted to determine the motion vector resolution, the motion vector prediction, and the motion vector difference.

In the mode in which the correspondence between the motion vector predictions and the motion vector resolutions is used, one possible implementation method for determining the motion vector resolution, the motion vector prediction, and the motion vector difference is that: the encoder traverses all candidate motion vector resolutions, and find, for each motion vector resolution, the corresponding motion vector prediction according to the corresponding method between the motion vector resolutions and the motion vector predictions described above. The optimal motion vector at this resolution is determined by the motion searching method, and the motion vector difference is calculated, and then the coding costs of encoding the current block using the optimal motion vectors at different resolutions are compared, thereby determining the combination of the optimal motion vector resolution and motion vector prediction, and the motion vector difference at this resolution.

Another possible implementation method is that: the encoder traverses all the candidate motion vector values, determines, for each motion vector value, the combination of the optimal motion vector resolution and motion vector prediction, and then compares the coding costs of encoding the current block using the motion vectors at the respective optimal motion vector resolutions, thereby determining the combination of the optimal motion vector resolution and the motion vector prediction, and the motion vector difference at the resolution.

Among others, the candidate motion vector resolutions at step 501 are commonly stipulated by the encoder and decoder or specified in the encoding/decoding standards, and the candidate motion vector resolutions can be stipulated as one or more of one-sixteenth pixel, one-eighth pixel, one-quarter pixel, one-second pixel, full-pixel, two-pixel, four-pixel, eight-pixel, sixteen-pixel, or other power-of-two-pixel resolution.

At step 502, the determined motion vector prediction mode, motion vector resolution information, motion vector prediction (if needed), and optimal motion vector difference information are written into the bitstream.

The motion vector prediction mode information can be written into the bitstream in the form of one bit of flag information.

One possible method is to set the flag information to "0" if the motion vector prediction mode is the mode in which the correspondence between the motion vector predictions and the motion vector resolutions is not used; otherwise, set it to "1".

Another possible method is to set the flag information to "1" if the motion vector prediction mode is the mode in which the correspondence between the motion vector predictions and the motion vector resolutions is not used; otherwise, set it to "0".

The motion vector resolution information can be written into the bitstream in the form of the index, and the optimal motion vector difference information can be written into the bitstream using any existing motion vector difference coding scheme. If the motion vector prediction mode is the mode in which the correspondence between the motion vector predictions and the motion vector resolutions is not used, and the motion vector prediction stipulated by the encoder/decoder is not unique, the motion vector prediction information needs to be transmitted in the bitstream, and the motion vector prediction information may be written into the bitstream using any existing method for encoding the motion vector prediction.

Optionally, the prediction direction information may also be written into the bitstream as needed. One of the following methods can be adopted to determine the prediction direction in the mode in which the correspondence between the motion vector predictions and the motion vector resolutions is used:

(1) Regardless whether the prediction direction of the motion vector prediction is to refer to only a first reference frame list, only a second reference frame list, or the two reference frame lists, the encoder attempts these three directions, that is, the optional range of the prediction directions includes the three directions.

(2) If the prediction direction of the motion vector prediction is to refer to only the first reference frame list, only the second reference frame list, or one of the two reference frame lists, the encoder only attempts the referred one direction.

(3) If the prediction direction of the motion vector prediction is to refer only to the first reference frame list or the second reference frame list, the encoder only attempts that direction.

(4) If the prediction direction of the motion vector prediction refers to the two reference frame lists, the encoder attempts these three directions.

It will be understood by those skilled in the art that the above methods for determining the prediction direction are merely exemplarily listed for the purpose of illustration and description, and any of the existing well-known determination methods or new methods developed in the future may be adopted.

The method for determining the prediction direction in the mode in which the correspondence between the motion vector predictions and the motion vector resolutions is not used is not described again, in order not to obscure the inventive concept.

Optionally, the reference frame information may also be written into the bitstream as needed. One of the following methods can be adopted to determine the reference frame in the mode in which the correspondence between the motion vector predictions and the motion vector resolutions is used:

(1) The encoder can traverse all reference frames in the reference frame list at the current prediction direction. The prediction value of the motion vector prediction under the reference frame is obtained by scaling the value of the motion vector prediction, and the method for scaling is not limited in the present invention.

(2) The encoder only attempts the reference frame corresponding to the determined prediction direction of the motion vector prediction.

It will be understood by those skilled in the art that the above determination methods of the reference frame are merely exemplarily listed for the purpose of illustration and description, and any of the existing well-known determination methods or new methods developed in the future may be adopted.

The method for determining the reference frame in the mode in which the correspondence between the motion vector predictions and the motion vector resolutions is not used is not described again, in order not to obscure the inventive concept.

In the mode in which the correspondence between the motion vector predictions and the motion vector resolutions is used, for the prediction direction information, whether to transmit the prediction direction information may be commonly stipulated by the encoder/decoder or specified by encoding/decoding standards.

In one example, it may be specified that, in the mode in which the correspondence between the motion vector predictions and motion vector resolutions is used, the prediction direction information is transmitted in the bitstream regardless of the prediction direction of the motion vector prediction corresponding to the motion vector resolution.

In one example, it may be specified that, in the mode in which the correspondence between the motion vector predictions and the motion vector resolutions is used, regardless of the prediction direction of the motion vector prediction corresponding to the motion vector resolution, the prediction direction information is not transmitted in the bitstream, but the prediction direction is considered to be the same as the prediction direction of the motion vector prediction corresponding to the motion vector resolution by default.

In one example, it may be specified that, in the mode in which the correspondence between the motion vector predictions and the motion vector resolutions is used, if the prediction direction of the motion vector prediction corresponding to the motion vector resolution is to refer only to the first reference frame list or the second reference frame list, the prediction direction information is not transmitted in the bitstream, but the prediction direction is considered to be the same as the prediction direction of the motion vector prediction corresponding to the motion vector resolution by default. If the prediction direction of the motion vector prediction corresponding to the motion vector resolution is to refer to the two reference frame lists, the prediction direction information needs to be transmitted in the bitstream.

If it is determined that the prediction direction information needs to be transmitted in the bitstream, the prediction direction information may be encoded into the bitstream using any existing method for encoding prediction direction information.

In the mode in which the correspondence between the motion vector predictions and the motion vector resolutions is used, for the reference frame information, whether to transmit the reference frame information may be commonly stipulated by the encoder/decoder or specified by encoding/decoding standards.

In one example, it may be specified that, in the mode in which the correspondence between the motion vector predictions and motion vector resolutions is used, the reference frame information is transmitted in the bitstream regardless of the reference frame of the motion vector prediction corresponding to the motion vector resolution.

In one example, it may be specified that, in the mode in which the correspondence between motion vector predictions and motion vector resolutions is used, regardless of the reference frame of the motion vector prediction corresponding to the motion vector resolution, the reference frame information is not transmitted in the bitstream, but the reference frame is considered to be the same as the reference frame of the motion vector prediction corresponding to the motion vector resolution by default.

In one example, it may be specified that, in the mode in which the correspondence between the motion vector predictions and the motion vector resolutions is used, if the prediction direction of the motion vector prediction corresponding to the motion vector resolution is to refer only to the first reference frame list or the second reference frame list, the reference frame information is not transmitted in the bitstream, but the reference frame is considered to be the same as the reference frame of the motion vector prediction corresponding to the motion vector resolution by default. If the prediction direction of the motion vector prediction corresponding to the motion vector resolution is to refer to the two reference frame lists, the reference frame information needs to be transmitted in the bitstream.

If it is determined that the reference frame information is to be transmitted in the bitstream, the reference frame information may be encoded using any existing method for encoding reference frame information.

III. Decoding Method for Motion Vector Information

First Embodiment of the Decoding Method for Motion Vector Information

Corresponding to the above method for encoding motion vector information based on the above corresponding method between the motion vector resolutions and the motion vector predictions provided in the present application, the present application proposes a decoding method for motion vector information. FIG. 6 schematically illustrates a flowchart 600 in a first embodiment of decoding for the motion vector information based on the above corresponding method between the motion vector resolutions and the motion vector predictions described above.

At step 601: the bitstream is parsed for the motion vector resolution information and the motion vector difference information, and the motion vector resolution, the motion vector prediction, and the motion vector difference *?* at the motion vector resolution are determined.

Specifically, one possible parsing method for the motion vector resolution information is parsing for the index of the motion vector resolution, thereby determining the motion vector resolution.

Specifically, a method for determining the motion vector prediction may include determining the motion vector prediction according to the determined motion vector resolution and the above corresponding method between the motion vector resolutions and the motion vector predictions.

The parsing method for the motion vector difference information may be any existing parsing method for the motion vector difference.

Optionally, based on the description of the above encoding method, the bitstream may also be parsed for the prediction direction information and/or the reference frame information (if needed).

Whether to parse for the prediction direction information or not is commonly stipulated by the encoder/decoder or specified by the encoding/decoding standards.

In one example, it may be specified to parse for the prediction direction information regardless of the prediction direction of the motion vector prediction corresponding to the motion vector resolution.

In an example, it may be specified that, regardless of the prediction direction of the motion vector prediction corresponding to the motion vector resolution, the prediction direction information is not parsed for, but the prediction direction is set to be the same as the prediction direction of the motion vector prediction corresponding to the motion vector resolution by default.

In an example, it may be specified that if the prediction direction of the motion vector prediction corresponding to the motion vector resolution is to refer only to the first reference frame list or the second reference frame list, the prediction direction information is not parsed for, but the prediction direction is set to be the same as the prediction direction of the motion vector prediction corresponding to the motion vector resolution by default. If the prediction direction of the motion vector prediction corresponding to the motion vector resolution is to refer to the two reference frame lists, the prediction direction information is parsed for.

The parsing method for the prediction direction information may be any existing parsing method for the prediction direction information.

Whether to parse for the reference frame information or not is commonly stipulated by the encoder/decoder or specified by the encoding/decoding standards.

In one example, it may be specified to parse for the reference frame information regardless of the reference frame of the motion vector prediction corresponding to the motion vector resolution.

In an example, it may be specified that, regardless of the reference frame of the motion vector prediction corresponding to the motion vector resolution, the reference frame information is not parsed for, but the reference frame is set to be the same as the reference frame of the motion vector prediction corresponding to the motion vector resolution by default.

In an example, it may be specified that if the prediction direction of the motion vector prediction corresponding to the motion vector resolution is to refer only to the first reference frame list or the second reference frame list, the reference frame information is not parsed for, but the reference frame is set to be the same as the reference frame of the motion vector prediction corresponding to the motion vector resolution by default. If the prediction direction of the motion vector prediction corresponding to the motion vector resolution is to refer to the two reference frame lists, the reference frame information is parsed for.

The parsing method for the reference frame information may be any existing parsing method for the reference frame information.

At step 602: the motion vector is derived from the determined motion vector resolution, motion vector prediction, and motion vector difference at the motion vector resolution.

Optionally, in the case of parsing for (which can be used interchangeably with "determining" or "decoding for") the prediction direction and the reference frame, the prediction value of the motion vector prediction may be scaled according to the prediction direction of the motion vector prediction, the reference frame and the prediction direction of the current block, and the reference frame, and the scaling method is not limited in present invention.

The motion vector difference at the current motion vector resolution is scaled to obtain the motion vector difference at a reference motion vector resolution.

The motion vector is derived from the prediction value of the motion vector prediction or the scaled value for the prediction value and the motion vector difference at the reference motion vector resolution.

At step 603: after the motion vector is derived, the reference block in the reference frame is obtained according to the motion vector and the subsequent decoding operation is performed. The specific obtaining method is not limited by the invention.

Second Embodiment of the Decoding Method for Motion Vector Information

The present application also proposes another decoding method for motion vector information. FIG. 7 schematically illustrates a flowchart 700 in a second embodiment of decoding for motion vector information. Among others, the decoding method exemplarily shown in the flowchart 700 of the second embodiment can be regarded as corresponding to the encoding method illustrated in FIG. 5.

At step 701: the bitstream is parsed for the motion vector prediction mode information, the motion vector resolution information, the motion vector prediction information (if needed), and the motion vector difference information, and the motion vector resolution, the motion vector prediction, and the motion vector difference at the motion vector resolution are determined.

One possible parsing method for motion vector prediction mode information is that, if the flag information of the motion vector prediction mode is "0", the motion vector prediction mode is the mode in which the correspondence between the motion vector predictions and the motion vector resolutions is not used. Otherwise, if the flag information of the motion vector prediction mode is "1", the motion vector prediction mode is the mode in which the correspondence between the motion vector predictions and the motion vector resolutions is used.

Another possible parsing method for motion vector prediction mode information is that, if the flag information of the motion vector prediction mode is "1", the motion vector prediction mode is the mode in which the correspondence between the motion vector predictions and the motion vector resolutions is not used. Otherwise, if the flag information of the motion vector prediction mode is "0", the motion vector prediction mode is the mode in which the correspondence between the motion vector predictions and the motion vector resolutions is used.

One possible parsing method for motion vector resolution information is parsing for the index of the motion vector resolution, thereby determining the motion vector resolution.

If the motion vector prediction mode is the mode in which the correspondence between the motion vector predictions and the motion vector resolutions is used, the motion vector prediction is determined according to the determined motion vector resolution and the corresponding method between the motion vector resolutions and the motion vector predictions. If the motion vector prediction mode is the mode in which the correspondence between the motion vector predictions and the motion vector resolutions is not used, and the motion vector prediction stipulated by the encoder/decoder is not unique, the motion vector prediction information is parsed for. The parsing method for motion vector prediction information may use any existing parsing method for the motion vector prediction, and the specific parsing method is not limited in the present invention.

The parsing method for motion vector difference information may be any existing parsing method for the motion vector difference.

Optionally, in the case where the prediction direction information and the reference frame information are written at the encoder side, the prediction direction information and the reference frame information may also be parsed for at the decoder side.

For the prediction direction information and the reference frame information, if the motion vector prediction mode is the mode in which the correspondence between the motion vector predictions and the motion vector resolutions is used, whether to parse for the prediction direction information and the reference frame information or not and the parsing method may refer to the related content described at step 601. If the motion vector prediction mode is the mode in which the correspondence between the motion vector predictions and the motion vector resolutions is not used, parsing for the prediction direction information and the reference frame information is not limited in the present invention.

At step 702: the motion vector is derived from the determined motion vector resolution, motion vector difference at the determined motion vector resolution, and motion vector prediction.

The specific operation of deriving the motion vector according to the determined motion vector resolution, motion vector difference at the determined motion vector resolution, and the motion vector prediction may refer to the description at step 602.

At step 703: after the motion vector is derived, the reference block is obtained according to the motion vector and the subsequent decoding operation is performed. The specific obtaining method is not limited in the present invention.

IV. Binarization of Index of Motion Information

In order to solve the above problems in the binarization technique of the index of the motion information in prior art, the present application proposes a new binarization method for the index of the motion information. For convenience of description and explanation, description will be made below with reference to FIGS. 8 and 9. FIG. 8 schematically illustrates a flowchart 800 of a method for binarizing the index of the motion information in the inter-skip mode or the inter-direct mode at the encoder side. FIG. 9 schematically illustrates a flowchart 900 of obtaining motion information at the decoder side by decoding the binarization information derived based on the binarization method for the index of the motion information in the inter-skip mode or the inter-direct mode.

At step 801, the candidate motion information lists are classified into a plurality of categories.

Specifically, in a case where the candidate motion information lists include the history-based motion vector prediction list, the spatial candidate list and the temporal candidate list, one possible implementation method is to classify the temporal and spatial motion information of the peripheral blocks of the current block into one category, the index of the category denoted as "0"; and to classify the historical motion information into another category, the index of the another category denoted as "1".

A possible implementation method is to classify the historical motion information into one category, the index of the category denoted as "0"; and to classify the temporal and spatial motion information of the peripheral blocks of the current block into another category, the index of the another category denoted as "1".

At step 802: the index of the category and the index of the current motion information in the candidate motion information list category into which the current motion information is classified are binarized.

Specifically, a possible implementation method is that the index of the category is fixed-length coded, that is, the index "0" of the category corresponds to binarization "0", and the index "1" of the category corresponds to binarization "1"; the index of the current motion information in the candidate motion information list category into which the current motion information is classified is binarized by truncating the unary code.

Those skilled in the art should be able to understand that the method for binarizing the index of the category and the method for binarizing the index of the current motion information in the candidate motion information list category into which the current motion information is classified may be the same method or different methods.

The method for binarizing the index of the category and the method for binarizing the index of the current motion information in the candidate motion information list category into which the current motion information is classified are not limited herein, and any existing or future developed binarization method may be used.

At step 803: the binarization information of the index of the category and the binarization information of the index of the current motion information in the candidate motion information list category into which the current motion information is classified are written into the bitstream.

FIG. 9 schematically illustrates a flowchart 900 of obtaining motion information at the decoder side by decoding the binarization information derived based on the binarization method for the index of the motion information in the inter-skip mode or the inter-direct mode.

At step 901: the decoder parses the bitstream for the index of the category and the index of the current motion information in the candidate motion information list category into which the current motion information is classified.

Specifically, a possible implementation method is to obtain the index of the category by applying the inverse binarization method of the fixed-length coding to the binarization information of the index of the category in the bitstream; and to obtain the index of the current motion information in the candidate motion information list category into which the current motion information is classified, by applying the inverse binarization method using truncating the unary code to the binarization information of the index of the current motion information in the candidate motion information list category into which the current motion information is classified in the bitstream.

It should be understood by those skilled in the art that the methods for inverse-binarizing the binarization information of the index of the category in the bitstream and the binarization information of the index of the current motion information in the candidate motion information list category into which the current motion information is classified in the bitstream can be the same method or different methods.

The method for inverse binarization is not limited herein, and any existing or future developed inverse binarization method may be used.

At step 902: the candidate motion information lists are classified into a plurality of categories.

Specifically, one possible implementation method is to classify the candidate motion information lists according to the same classification method at the encoder side, and thus the classification categories that can be obtained are the same as the ones obtained at the encoder side.

Specifically, a scaled information for the temporal and spatial motion information of the peripheral blocks of the current block is classified into one category, the index of the category denoted as "0"; and the historical motion information is classified into another category, the index of the another category denoted as "1".

A possible implementation method is to classify the historical motion information into one category, the index of the category denoted as "0"; and to classify the temporal and spatial motion information of the peripheral blocks of the current block into another category, the index of the another category denoted as "1".

At step 903: the motion information is determined based on the parsed index of the category and index of the current motion information in the candidate motion information list category into which the current motion information is classified.

Specifically, a possible implementation method is to determine, by using the index of the category, into which category the current motion information is classified, and to find the motion information in the determined category by using the index of the current motion information in the candidate motion information list category into which the current motion information is classified.

Corresponding to the above-described methods for processing the binarization information at the encoder/decoder side, the present application also proposes apparatuses for performing the methods, which will be described below with reference to FIGS. 10 and 11.

FIG. 10 schematically illustrates an apparatus 1000 for binarizing the index of the motion information in the inter-skip mode or the inter-direct mode.

The apparatus 1000 may include a classification unit 1001, a binarizing unit 1002, and a binarization information writing unit 1003.

The classification unit 1001 may be configured to classify the candidate motion vector lists into a plurality of different categories.

Exemplarily, in a case where the candidate motion information lists include the history-based motion vector prediction list, the spatial candidate list and the temporal candidate list, one possible implementation method is to classify the temporal and spatial motion information of the peripheral blocks of the current block into one category, the index of the category denoted as "0"; and to classify the historical motion information into another category, the index of the another category denoted as "1".

A possible implementation method is to classify the historical motion information into one category, the index of the category denoted as "0"; and to classify the temporal and spatial motion information of the peripheral blocks of the current block into another category, the index of the another category denoted as "1".

The binarizing unit 1002 may be configured to binarize the index of each of the plurality of categories obtained by the classifying unit 1001 classifying the candidate motion information lists, and the index *?* of the current motion information in the candidate motion information list category into which the current motion information is classified.

Exemplarily, a possible implementation method is that the index of the category is fixed-length coded, that is, the index "0" of the category corresponds to binarization "0", and the index "1" of the category corresponds to binarization "1"; the index of the current motion information in the candidate motion information list category into which the current motion information is classified is binarized by truncating the unary code.

The binarization information writing unit 1003 may be configured to write the binarization result obtained in the binarizing unit 1002 into the bitstream.

Specifically, the binarization information writing unit 1003 may write the binarization result of the index of each of the plurality of categories of the candidate motion information lists and the index of the current motion information in the candidate motion information list category into which the current motion information is classified, into the bitstream.

FIG. 11 schematically illustrates an apparatus 1100 for obtaining the motion information based on binarization information of the index of the motion information in the inter-skip mode or the inter-direct mode.

The apparatus 1100 may include a parsing unit 1101, a classifying unit 1102, and a determining unit 1103.

The parsing unit 1101 may be configured to parse the bitstream for the index of the category and the index of the current motion information in the candidate motion information list category into which the current motion information is classified.

Specifically, a possible implementation method is to obtain the index of the category by applying the inverse binarization method of the fixed-length coding to the binarization information of the index of the category in the bitstream; and to obtain the index of the current motion information in the candidate motion information list category into which the current motion information is classified, by applying the inverse binarization method using truncating the unary code to the binarization information of the index of the current motion information in the candidate motion information list category into which the current motion information is classified in the bitstream.

The classifying unit 1102 may be configured to classify the candidate motion vector lists into a plurality of different categories.

Specifically, a possible implementation method is to classify the scaled information for the temporal and spatial motion information of the peripheral blocks of the current block into one category, the index value of the category denoted as "0"; and to classify the historical motion information into another category, the index of the another category denoted as "1".

A possible implementation method is to classify the historical motion information into one category, the index of the category denoted as "0"; and to classify the temporal and spatial motion information of the peripheral blocks of the current block into another category, the index of the another category denoted as "1".

The determining unit 1103 may be configured to determine the motion information based on the parsed index of the category and the index of the current motion information in the candidate motion information list category into which the current motion information is classified.

Specifically, a possible implementation method is to determine, by using the index of the category, into which category the current motion information is classified, and to find the motion information in the determined category by using the index of the current motion information in the candidate motion information list category into which the current motion information is classified.

Each of the modules and units described above may be implemented by software, hardware, firmware, or a combination thereof. For example, it may be implemented, for example, by a computer program including a set of instructions maintained in a computer readable medium. The set of instructions is code that performs the above operations. The computer readable medium includes a computer storage medium and a communication medium including any medium that facilitates transfer of the computer program from one place to another. The storage medium may be any available medium that can be accessed by the computer. By way of example and not limitation, such computer readable medium may include RAM, ROM, EEPROM, CD-ROM or other optical disk storage, disk storage or other magnetic storage device, or any other medium that transmits or stores the desired program code in form of instructions or data structure and that can be accessed by a computer. Moreover, any connection is properly termed as a computer-readable medium. For example, if coaxial cables, fiber optic cables, twisted pairs, digital subscriber lines (DSLs), or wireless techniques (for example, infrared, radio, and microwave) are used to transfer software from a website, server, or other remote source, then the definition on the medium includes coaxial cables, fiber optic cables, twisted pairs, DSLs, or wireless techniques (e.g., infrared, radio, and microwave). Disks and discs used herein include compact discs (CDs), laser discs, optical discs, digital versatile discs (DVDs), floppy discs, and Blu-ray™ discs, among others, the disks typically magnetically reproduce data while the discs optically reproduce data through the laser. Thus, in some aspects, the computer readable medium may include a permanent computer readable medium (e.g., tangible medium). Moreover, in some aspects, the computer readable medium can include a transitory computer readable medium (e.g., a signal). Combinations of the above should also be included within the scope of the computer readable medium.

Although specific embodiments have been described in detail above, the description is for the purpose of illustration only. Therefore, it should be understood that many of the above aspects are not intended to be essential or essential elements unless specifically stated otherwise. In addition to the above-described exemplary implementations, those of ordinary skill in the art having the benefits of the present disclosure may make various respective modifications and equivalent operations for the disclosure of the exemplary embodiments without departing from the spirit and scope of the disclosure as defined by the appended claims. The scope of the present disclosure is to be construed broadly, and the modifications and equivalent structures are included therein.

The invention claimed is:

1. A method for encoding motion vector information, the method comprising:
    determining index information indicating a motion vector resolution for a current block among a plurality of motion vector resolutions;
    determining a motion vector prediction corresponding to the index information among M motion vector predictions included in a history-based motion vector prediction list, wherein based on a value of the index information being equal to n, an $(M-n)^{th}$ motion vector prediction among the M motion vector predictions included in the history-based motion vector prediction list is determined;
    determining, for the current block, a motion vector difference based on the determined motion vector prediction corresponding to the index information and motion vector information of the current block; and
    encoding, into a bitstream, the index information indicating the motion vector resolution for the current block among the plurality of motion vector resolutions and motion vector difference information indicating the motion vector difference.

2. The method of claim 1, wherein based on the M being less than the value of the index information, an $M^{th}$ motion vector prediction in the history-based motion vector prediction list is determined.

3. An apparatus for encoding motion vector information, the apparatus comprising:
    at least one processor configured to:
    determine index information indicating a motion vector resolution for a current block among a plurality of motion vector resolutions,
    determine a motion vector prediction corresponding to the index information among M motion vector predictions included in a history-based motion vector prediction list, wherein based on a value of the index information being equal to n, an $(M-n)^{th}$ motion vector prediction among the M motion vector predictions included in the history-based motion vector prediction list is determined,
    determine, for the current block, a motion vector difference based on the determined motion vector prediction corresponding to the index information and motion vector information of the current block, and
    encode, into a bitstream, the index information indicating the motion vector resolution for the current block among the plurality of motion vector resolutions and motion vector difference information indicating the motion vector difference.

4. A method for decoding motion vector information, the method comprising:
    acquiring, from a bitstream, motion vector difference information indicating a motion vector difference for a current block and index information indicating a motion vector resolution for the current block among a plurality of motion vector resolutions;
    determining a motion vector prediction corresponding to the index information among M motion vector predictions included in a history-based motion vector prediction list wherein based on a value of the index information being equal to n, an $(M-n)^{th}$ motion vector prediction among the M motion vector predictions included in the history-based motion vector prediction list is determined; and determining motion vector information of the current block based on the motion vector difference for the current block and the determined motion vector prediction corresponding to the index information.

5. The method of claim 4, wherein based on the M being less than the value of the index information, an $M^{th}$ motion vector prediction in the history-based motion vector prediction list is determined.

6. An apparatus for decoding motion vector information, the apparatus comprising:

at least one processor configured to:

acquire, from a bitstream, motion vector difference information indicating a motion vector difference for a current block and index information indicating a motion vector resolution for the current block among a plurality of motion vector resolutions, determine a motion vector prediction corresponding to the index information among M motion vector predictions included in a history-based motion vector prediction list, wherein based on a value of the index information being equal to n, an $(M-n)^{th}$ motion vector prediction among the M motion vector predictions included in the history-based motion vector prediction list is determined, and determine motion vector information of the current block based on the motion vector difference for the current block and the determined motion vector prediction.

* * * * *